US012802856B2

(12) United States Patent
Garnier et al.

(10) Patent No.: US 12,802,856 B2
(45) Date of Patent: Nov. 17, 2026

(54) PASSIVE RUNAWAY ELECTRON MITIGATION COIL

(71) Applicant: Massachusetts Institute of Technology, Cambridge, MA (US)

(72) Inventors: Darren T. Garnier, Melrose, MA (US); Robert S. Granetz, Newton, MA (US); Ryan M. Sweeney, Salem, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 300 days.

(21) Appl. No.: 18/008,507

(22) PCT Filed: Jun. 10, 2021

(86) PCT No.: PCT/US2021/036814
§ 371 (c)(1),
(2) Date: Dec. 6, 2022

(87) PCT Pub. No.: WO2021/252765
PCT Pub. Date: Dec. 16, 2021

(65) Prior Publication Data

US 2024/0013933 A1 Jan. 11, 2024

Related U.S. Application Data

(60) Provisional application No. 63/037,161, filed on Jun. 10, 2020.

(51) Int. Cl.
*H01F 7/20* (2006.01)
*G21B 1/05* (2006.01)

(52) U.S. Cl.
CPC ............ *H01F 7/202* (2013.01); *G21B 1/057* (2013.01)

(58) Field of Classification Search
CPC ........... H01F 7/202; G21B 1/057; G21B 1/11; Y02E 30/10
See application file for complete search history.

(56) References Cited

U.S. PATENT DOCUMENTS 4,707,147 A 11/1987 Aoki et al.
4,921,661 A * 5/1990 Leuer .................... G21B 1/057 376/136

(Continued)

FOREIGN PATENT DOCUMENTS

CN 108172308 6/2018
CN 114740244 A 7/2022

(Continued)

OTHER PUBLICATIONS

Japanese Office Action (with English translation) dated May 12, 2025 for Japanese Patent Application No. 2022-575308; 12 pages.

(Continued)

*Primary Examiner* — Mohamad A Musleh
(74) *Attorney, Agent, or Firm* — Daly, Crowley, Mofford & Durkee, LLP

(57) ABSTRACT

Described are concepts, structures and techniques for passive mitigation of relativistic electrons produced in a tokamak plasma. These electrons may be referred to herein as "runaway" electrons (REs). In embodiments, a passive runaway electron mitigation coil (REMC) comprises an electrical conductor having a non-axisymmetric loop shape comprising a plurality of portions arranged along paths defined by the surface of a torus along a toroidal direction. In operation, the REMC is energized by a disruption-induced voltage, and the resulting magnetic field stochasticity causes electrons to be lost more rapidly than a RE beam can form. The REMC is configured for outboard side mounting within a vacuum vessel.

11 Claims, 15 Drawing Sheets

(56) References Cited

U.S. PATENT DOCUMENTS

| | | | |
|---|---|---|---|
| 5,379,020 | A | 1/1995 | Meier et al. |
| 5,426,408 | A | 6/1995 | Jones et al. |
| 5,432,669 | A | 7/1995 | Nemoto et al. |
| 6,034,324 | A | 3/2000 | Dixon et al. |
| 6,128,174 | A | 10/2000 | Ritter et al. |
| 6,313,623 | B1 | 11/2001 | Kojovic et al. |
| 6,344,956 | B1 | 2/2002 | Morita |
| 6,624,624 | B1 | 9/2003 | Karrer et al. |
| 6,900,714 | B1 | 5/2005 | Huang et al. |
| 7,307,410 | B2 | 12/2007 | Shiokawa et al. |
| 7,667,562 | B1 | 2/2010 | Weinstein |
| 8,598,681 | B2 | 12/2013 | Le Neel et al. |
| 2003/0051901 | A1 | 3/2003 | Morita et al. |
| 2005/0111159 | A1 | 5/2005 | Knight |
| 2008/0106253 | A1 | 5/2008 | Kojovic |
| 2008/0303511 | A1 | 12/2008 | Grno |
| 2010/0073146 | A1 | 3/2010 | Kai et al. |
| 2011/0026170 | A1 | 2/2011 | Husband et al. |
| 2011/0101950 | A1 | 5/2011 | Babb |
| 2012/0214674 | A1 | 8/2012 | Blakes et al. |
| 2013/0063131 | A1 | 3/2013 | Chamarti et al. |
| 2013/0099787 | A1 | 4/2013 | Lu et al. |
| 2014/0185165 | A1 | 7/2014 | Rajput-Ghoshal et al. |
| 2014/0357491 | A1 | 12/2014 | Nakagawa et al. |
| 2015/0213930 | A1 | 7/2015 | Hahn et al. |
| 2016/0086707 | A1 | 3/2016 | Hahn et al. |
| 2016/0156174 | A1 | 6/2016 | Kirby et al. |
| 2017/0243681 | A1 | 8/2017 | Somerkoski et al. |
| 2017/0261574 | A1 | 9/2017 | Stainsby et al. |
| 2018/0287407 | A1 | 10/2018 | Sayre |
| 2019/0011511 | A1 | 1/2019 | Stainsby et al. |
| 2019/0088391 | A1 | 3/2019 | Hahn et al. |
| 2019/0239951 | A1 | 8/2019 | Mu et al. |
| 2019/0362874 | A1 | 11/2019 | Amano et al. |
| 2020/0194153 | A1 | 6/2020 | Brunner |
| 2020/0402692 | A1 | 12/2020 | Brunner et al. |
| 2022/0068528 | A1 | 3/2022 | Brunner |
| 2022/0359111 | A1 | 11/2022 | Brunner et al. |
| 2023/0097465 | A1 | 3/2023 | Radovinsky et al. |

FOREIGN PATENT DOCUMENTS

| | | | |
|---|---|---|---|
| EP | 0482840 | | 12/1994 |
| ES | 2438618 | A1 | 1/2014 |
| JP | S 6431400 | | 2/1989 |
| JP | H0572365 | | 3/1993 |
| JP | H07-183582 | | 7/1995 |
| JP | H08138927 | A | 5/1996 |
| JP | H 08-191538 36 | | 7/1996 |
| JP | H08191538 | A | 7/1996 |
| JP | 2000277322 | A | 6/2000 |
| JP | 3278446 20 | | 4/2002 |
| JP | 2008041966 | A | 2/2008 |
| JP | 5594802 | B1 | 9/2014 |
| KR | 10-2004-0107948 | | 12/2004 |
| KR | 10-1194717 | B1 | 10/2012 |
| KR | 10-2016-0120984 | | 10/2016 |
| WO | WO 2011/002174 | A2 | 1/2011 |
| WO | WO 2011/074092 | A1 | 6/2011 |
| WO | WO 2021/195383 | | 9/2021 |
| WO | WO 2022/149012 | A1 | 7/2022 |

OTHER PUBLICATIONS

Response to Final Office Action (with English translation of Amended Claims) dated Nov. 11, 2024 for Korean Patent Application No. 10-2021-7041886; Response filed on Jan. 7, 2025; 19 pages.

European Examination Report dated Feb. 4, 2025 for European Patent Application No. 21743319.2; 4 pages.

Japanese Office Action (with English translation) dated Jan. 20, 2025 for Japanese Patent Application No. 2022-575308; 12 pages.

Office Action dated Nov. 27, 2025 for Korean Application No. 10-2022-7043417 with English Translation; 13 Pages.

Response to Office Action for Japanese Application No. 2022-575308 as filed on Dec. 25, 2025, with English Translation; 12 Pages.

Notice of Allowance dated Jan. 21, 2026 for Japanese Application No. 2022-575308 with English Translation; 5 Pages.

Response to Korean Office Action dated May 23, 2024 for Korean Patent Application No. 10-2021-7041886; Response (with English translation of Amended Claims) filed on Sep. 23, 2024; 95 pages.

Japanese Office Action (with English translation) dated Jun. 12, 2024 for Japanese Patent Application No. 2021-574940; 12 pages.

Response to Japanese Office Action (with English translation) dated Jun. 12, 2024 for Japanese Patent Application No. 2021-574940; Response filed on Nov. 12, 2024; 29 pages.

Berzak et al., "Magnetic Diagnostics for Equilibrium Reconstructions in the Presence of Nonaxisymmetric Eddy Current Distributions in Tokamaks (invited);" Review of Scientific Instruments, vol. 81, No. 10; Oct. 14, 2010; 7 Pages.

Chavan et al., "The Magnetics Diagnostic Set for ITER;" Journal Article from Fusion Engineering and Design, vol. 84; Available Online Feb. 4, 2009; pp. 295-299; 5 Pages.

Chen et al., "Upgrade of the Magnetic Diagnostic System for Restart of HT-6M Operation;" Chinese Physics B, vol. 31, No. 12; Jul. 8, 2022; 9 Pages.

Costley, "Towards Diagnostics for a Fusion Reactor;" IEEE Transactions on Plasma Science, vol. 38, No. 10; Oct. 2010; 10 Pages.

Gerhardt et al., "Techniques for the Measurement of Disruption Halo Currents in the National Spherical Torus Experiment;" Review of Scientific Instruments, vol. 82; Oct. 1, 2011; 9 Pages.

Granetz et al., "Magnetic Diagnostics in Alcator C-MOD;" Review of Scientific Instruments, vol. 61, No. 10, Part II; Oct. 1990; 3 Pages.

Hartfuss et al., "Diagnostics for Steady State Plasmas;" Topical Review; Plasma Physics and Controlled Fusion, vol. 48, No. 10; Oct. 1, 2006; 68 Pages.

Lee et al., "Magnetic Diagnostics for Korea Superconducting Tokamak Advanced Research;" Review of Scientific Instruments, vol. 72, No. 1; Jan. 2001; 3 Pages.

Moreau et al., "Development of a Magnetic Diagnostic Suitable for the ITER Radiation Environment;" Proceedings of the 1st International Conference on Advancements in Nuclear Instrumentation, Measurement Methods and Their Applications (ANIMMA 2009); Jun. 2009; 8 Pages.

Moreau et al., "The New Magnetic Diagnostics in the WEST Tokamak;" Review of Scientific Instruments, vol. 89, No. 10; Jul. 26, 2018; 5 Pages.

Neyatani et al., "Development of Magnetic Sensors in JT-60 Upgrade;" Proceedings of the IEEE/NPSS Symposium on Fusion Engineering; Sep. 30-Oct. 3, 1991; 6 Pages.

Shakeri et al., "Measurement of Plasma Current in Damavand Tokamak Using Magnetic Probes Assembly as a Discrete Rogowski Coil;" Fusion Engineering and Design, vol. 168; Mar. 2, 2021; 7 Pages.

Strait, "Magnetic Diagnostic System of the DIII-D Tokamak;" Review of Scientific Instruments, vol. 77, No. 2; Feb. 9, 2006; 14 Pages.

Sushkov et al., "Design of Inductive Sensors and Data Acquisition System for Diagnostics of Magnetohydrodynamic Instabilities on the T-15MD Tokamak;" Fusion Engineering and Design, vol. 146; Dec. 31, 2018; 5 Pages.

PCT Invitation to Pay Additional Fees and Partial Search Report dated Feb. 19, 2024 for International Application No. PCT/US2023/076758; 11 Pages.

PCT International Search Report and Written Opinion dated Apr. 9, 2024 for International Application No. PCT/US2023/076758; 28 Pages.

U.S. Appl. No. 17/796,481, filed Jul. 29, 2022, Radovinsky, et al.

Chen, et al.; "Development of a Digital Quench Detection and Dumping Circuit With Constant Voltage System for SMES"; IEEE Transactions on Applied Superconductivity; vol. 20, No. 3; Jun. 2010; 4 Pages.

International Search Report and Written Opinion dated Sep. 7, 2020 for International Application No. PCT/US2020/038031; 22 Pages.

(56) References Cited

OTHER PUBLICATIONS

International Search Report and Written Opinion dated Apr. 29, 2020 for International Application No. PCT/2019/067116; 14 Pages.
International Preliminary Report on Patentability dated Jul. 1, 2021 for International Application No. PCT/US2019/067116; 11 Pages.
International Preliminary Report dated Dec. 30, 2021 for International Application No. PCT/US2020/038031; 16 Pages.
International Search Report and Written Opinion of the ISA dated Sep. 6, 2021 for International Application No. PCT/US2021/024130; 20 Pages.
International Preliminary Report on Patentability dated Dec. 22, 2022 for International Application No. PCT/US2021/036814; 11 Pages.
International Preliminary Report on Patentability dated Mar. 26, 2020 for International Application No. PCT/US2021/02430; 13 Pages.
International Search Report and Written Opinion of the ISA dated Jan. 26, 2022 for International Application No. PCT/US2021/020225; 15 Pages.
International Patent Cooperation Treaty PCT Third Party Observation dated Jul. 7, 2022 for International Application No. PCT/US2021/020225; 4 Pages.
International Communication In Cases For Which No Other Form Is Applicable dated Jul. 7, 2022 for International Application No. PCT/US2021/020225; NPL References; 15 Pages.
International Preliminary Report on Patentability dated Sep. 22, 2022 for International Application No. PCT/US2021/020225; 11 Pages.
International Search Report and Written Opinion of the ISA dated Mar. 15, 2023 for International Application No. PCT/US2022/049517; 15 Pages.
Markiewicz, et al.; "900 MHz Wide Bore NMR Spectrometer Magnet at NHMFL"; IEEE Transactions on Applied Superconductivity; vol. 10, No. 1; Mar. 2000; 4 Pages.
Marchevsky; "Protection of Superconducting Magnet Circuits"; Lawrence Berkeley National Laboratory; USPAS 2017; http://uspas.fnal.gov/materials/17UCDavis/MachineProtection/uspas_mm.pdf; 29 pages.
Liao, et al.; "Signal De-Noising of Quench Detection by Real-Time Wavelet Analysis Algorithm for HTS Coil and Magnet"; IEEE Transactions on Applied Superconductivity; vol. 27, No. 4; Jun. 2017; 5 Pages.
Response to Communication Pursuant to Rules 161(1) and 162 EPC dated Jan. 25, 2022 for European Application No. 20736847.3 as filed on Jul. 25, 2022; 49 Pages.
Response to communication pursuant to Rules 161(2) and 162 EPC for European Application No. 21743319.2 as filed on Jul. 27, 2023; 15 Pages.
Suetomi, et al.; "A Novel Winding Method for a no-insulation layer-wound REBCO Coil to Provide a Short Magnetic Field Delay and Self-Protect Characteristics"; Superconductor Science and Technology; vol. 32, No. 4; Feb. 20, 2019; 14 Pages.
Tanaka, et al.; "Development of the Current Bypassing Methods into the Transverse Direction in Non-insulation HTS Coils"; Physics Procedia; 27$^{th}$ International Symposium on Superconductivity; vol. 65; Jan. 1, 2015; 4 Pages.
Notice of Allowance dated Jan. 23, 2026 for European Application No. 21743319.2; 8 Pages.
Response to Communication pursuant to Rules 161(2) and 162 EPC dated Jan. 1, 2023 for European Patent Application No. 21743319.2; Response filed on Jul. 27, 2023; 22 pages.
Examination Report dated Dec. 21, 2023 for European Patent Application No. 21743319.2; 6 pages.
Korean Office Action (with English translation) dated May 23, 2024 for Korean Application No. 10-2021-7041886; 18 pages.
International Search Report and Written Opinion dated Jun. 5, 2024 for International Application No. PCT/US2024/013492; 14 pages.
Response to Examination Report dated Dec. 21, 2023 for European Patent Application No. 21743319.2; Response filed on Jun. 6, 2024; 22 pages.
Suttrop et al., "Studies of edge localized mode mitigation with new active in-vessel saddle coils in ASDEX Upgrade", Plasma Physics and Controlled Fusion, vol. 53, No. 12, Nov. 14, 2011; 8 pages.
Suttrop et al., "First Observation of Edge Localized Modes Mitigation with Resonant and Nonresonant Magnetic Perturbations in ASDEX Upgrade", Physical Review Letters, vol. 106, No. 22, Jun. 1, 2011; 4 pages.
European Communication pursuant to Article 94(3) EPC dated Dec. 11, 2025 for European Patent Application No. 20736847.3; 20 pages.
Japanese Petition for responding to the Reconsideration Report dated Jun. 20, 2025 for Japanese Patent Application No. 2021-574940; Petition (with machine English translation) dated Nov. 12, 2025; 10 pages.
Korean Notice of Allowance (with English translation) dated Apr. 18, 2025 for Korean Patent Application No. 10-2021-7041886; 9 pages.
Restriction Requirement dated Jun. 17, 2025, for U.S. Appl. No. 17/616,362; 7 pages.
Response to Restriction Requirement dated Jun. 17, 2025, and Preliminary Amendment, for U.S. Appl. No. 17/616,362; Response filed Aug. 6, 2025; 8 pages.
Office Action dated Oct. 20, 2025, for U.S. Appl. No. 17/616,362; 13 pages.
Response to Final Office Action dated Jul. 15, 2025 for U.S. Appl. No. 17/312,784; Response (with RCE) filed on Dec. 12, 2025; 21 pages.
Response to Japanese Office Action (with machine English translation) dated May 12, 2025 for Japanese Patent Application No. 2022-575308; Response filed on Sep. 10, 2025; 12 pages.
Japanese Final Office Action (with English translation) dated Oct. 28, 2025 for Japanese Patent Application No. 2022-575308; 5 pages.
Examination Report dated Jun. 26, 2024 for European Patent Application No. 20736847.3; 8 pages.
Response to communication pursuant to Rule 161(1) and 162 EPC dated Jun. 19, 2024 for European Application No. 22826743.1 as filed on Dec. 18, 2024; 14 Pages.
PCT International Search Report and Written Opinion dated Sep. 21, 2021 for International Application No. PCT/US2021/036814; 20 Pages.
Rechester, et al.; "Electron Heat Transport in a Tokamak with Destroyed Magnetic Surfaces"; Physical Review Letters; vol. 40, No. 1; Jan. 2, 1978; 4 Pages.
Boozer et al.; "Two beneficial non-axisymmetric perturbations to tokamaks"; IOP Publishing; Plasma Physics and Controlled Fusion; vol. 53, No. 084002; 2011; 7 Pages.
Breizman et al.; "Physics of runaway electrons in tokamaks"; Nuclear Fusion; vol. 59, No. 8; Jun. 19, 2019; 70 Pages (Part 1).
Breizman et al.; "Physics of runaway electrons in tokamaks"; Nuclear Fusion; vol. 59, No. 8; Jun. 19, 2019; 79 Pages (Part 2).
Gobbin et al.; "Runaway electron mitigation by 3D fields in the ASDEX-Upgrade experiment"; IOP Publishing; Plasma Physics and Controlled Fusion; vol. 60, No. 014036; Published Nov. 10, 2017; 12 Pages.
Helander et al.; "Suppression of runaway electron avalanches by radial diffusion"; 27$^{th}$ EPS Conference on Contr. Fusion and Plasma Phys.; ECA vol. 24B; Jun. 12-16, 2000; 5 Pages.
Lehnen et al.; "Suppression of Runaway Electrons by Resonant Magnetic Perturbations in TEXTOR Disruptions"; The American Physical Society; Physical Review Letters; vol. 100, No. 255003; Jun. 27, 2008; 5 Pages.
Park et al.; "Control of asymmetric magnetic perturbations in tokamaks"; Princeton Plasma Physics Laboratory; Physical Review Letters; vol. 99; Oct. 2007; 8 Pages.
Rott et al.; "Electro-magnetic modeling of the planned active in-vessel coils at ASDEX Upgrade"; Fusion Engineering and Design; vol. 84; Available online Jan. 29, 2009; 5 Pages.
Wikipedia; "Wendelstein 7-X"; last edited Jun. 3, 2020; https://en.wikipedia.org/w/index.php?title=Wendelstein_7-X&oldid=960446105; 7 Pages.

(56) References Cited

OTHER PUBLICATIONS

Yoshino et al.; "Runaway electrons in magnetic turbulence and runaway current termination in tokamak discharges"; Nuclear Fusion; vol. 40, No. 1293; 2000; 18 Pages.
Zhang et al.; "Passive control of runaway electron displacement by magnetic energy transfer in J-TEXT"; Fusion Engineering and Design; vol. 146; Available online Feb. 18, 2019; 4 Pages.
Response to European Examination Report dated Jun. 26, 2024 for European Patent Application No. 20736847.3; Response filed on Nov. 25, 2024; 16 pages.
Korean Final Office Action (with English translation) dated Nov. 11, 2024 for Korean Patent Application No. 10-2021-7041886; 5 pages.
Final Office Action dated Jul. 15, 2025, for U.S. Appl. No. 17/312,784; 29 pages.
Response (with English Translation) to Japanese Office Action dated Jan. 20, 2025 for Japanese Application No. 2022-575308; Response filed on Apr. 23, 2025; 10 Pages.
Office Action dated Jan. 30, 2025, for U.S. Appl. No. 17/312,784; 24 pages.
Response to Office Action dated Jan. 30, 2025, for U.S. Appl. No. 17/312,784; Response filed Apr. 18, 2025; 20 pages.
Office Action dated Feb. 23, 2026, for U.S. Appl. No. 17/312,784; 19 pages.
Response to Office Action dated Feb. 23, 2026, for U.S. Appl. No. 17/312,784; Response filed Apr. 30, 2026; 8 pages.
Restriction Requirement dated Mar. 12, 2026, for U.S. Appl. No. 17/911,270; 7 pages.
Office Action dated Apr. 13, 2026, for U.S. Appl. No. 17/796,481; 28 pages.
Response to Korean Office Action (w/English translation) dated Nov. 27, 2025, for Korean Application No. 10-2022-7043417; Response filed Mar. 26, 2026; 49 pages.
Korean Notice of Preliminary Rejection (w/English translation) dated Feb. 13, 2026, for Korean Application No. 10-2024-7013379; 18 pages.
Trial and Appeal Decision (w/English translation) dated Mar. 2, 2026, for Japanese Application No. 2021-574940; 9 pages.
Intention to Grant dated Apr. 13, 2026, for European Application No. 22826743.1; 9 pages.
Li et al., "Persistent Current Switch for HTS Superconducting Magnets: Design, Control Strategy, and Test Results"; IEEE Transactions on Applied Superconductivity, vol. 29, No. 2; Mar. 2019; 4 pages.
Response to Office Action dated Oct. 20, 2025, for U.S. Appl. No. 17/616,362; Response filed Jan. 16, 2026; 13 pages.
Notice of Allowance dated Apr. 22, 2026, for U.S. Appl. No. 17/616,362; 9 pages.
Office Action dated Jun. 25, 2026 for U.S. Appl. No. 17/911,270; 7 Pages.
Response to European Communication pursuant to Article 94(3) EPC as filed on May 25, 2026; 27 Pages.
Response filed Jun. 4, 2026, for Korean Application No. 10-2024-7013379 with English Translation; 23 Pages.
Notice of Allowance dated May 20, 2026 for U.S. Appl. No. 17/312,784; 8 Pages.

* cited by examiner

PASSIVE RUNAWAY ELECTRON MITIGATION COIL

CROSS REFERENCE TO RELATED APPLICATIONS

Cross Reference Section

This application is a 371 National Stage Entry of International Patent Application PCT/US2021/036814 filed in the English language on Jun. 10, 2021, which claims the benefit of U.S. Provisional application 63/037,161 filed on Jun. 10, 2020, which applications are hereby incorporated by reference in their entireties.

BACKGROUND

Actively driven coils have been used successfully for runaway electron mitigation. Actively driven coils may be located on either an outboard or inboard side wall of the tokamak. Active coils, however, are not practical for high field and high current devices where it is desirable to produce field energies of megajoules in a few milliseconds.

SUMMARY

Described herein are concepts, structures and techniques for passive mitigation of relativistic electrons produced in a tokamak plasma. These electrons may be referred to herein as "runaway" electrons (REs).

In an embodiment, a conducting coil (referred to herein as a runaway electron mitigation coil—REMC), having a three-dimensional (3D) shape is energized by a disruption-induced voltage, and the resulting magnetic field stochasticity causes electrons to be lost more rapidly than a RE beam can form. The REMC is provided having a non-axisymmetric shape and is configured for outboard side mounting with a vacuum vessel. In some embodiments, the REMC may be formed from a single continuous loop of electrically conductive material.

In embodiments, the REMC expels the REs from tokamak plasma produced during disruptions before such electrons accelerate to high energy and multiply. The REMC causes runaway electron losses by opening tearing mode regions (or "islands") in the plasma that upon overlapping, generate a stochastic magnetic field that in turn results in stochastic movement of electrons out of the plasma. In addition to the vacuum fields produced by the REMC, the plasma further amplifies the fields. Runaway electrons follow (i.e. travel a path defined by) perturbed field lines out of the plasma and impact a random location of a wall or other surface, thereby distributing the energy of the REs in a way that results in reduced (and ideally minimized) damage to the wall. This process is diffusive and the loss rate characteristic may for instance correspond to the square of the perturbed field. Therefore, the REMC is configured to produce a perturbing field (and ideally, produce the largest perturbing field possible) within engineering constraints to overcome the avalanche, Compton scattering, and tritium beta decay growth terms. In embodiments, the REMC is driven by leveraging mutual inductance with the plasma during a current quench, and the non-axisymmetric shape of the coil produces resonant fields that open magnetic islands across the plasma minor radius.

The systems. structures and techniques described herein may comprise one or more of the following features alone or in combination with subsets of the enumerated features including but not limited to: outboard side mounting; vertical legs at each half period traveling between the ports and flexibility in the number of vertical coil legs. Also, the characteristic decay time (i.e. L/R time) may be tuned to increase (and ideally maximize) coupled currents while reducing (and ideally minimizing) the total forces.

The outboard side mounting allows the coil to be spaced from a vacuum vessel wall by a distance which results in a desired level of higher driven currents.

The vertical legs are disposed in the vacuum vessel to allow the REMC to avoid the ports in the vacuum vessel and thereby does not interfere with plasma access. The upper and lower toroidal legs may have the same length so that the REMC has a zero net coupling with vertical stability coils of the tokamak. Outboard side mounting together with the vertical stability coil reduces the number of required structural mounts.

In embodiments, the L/R time of the coil is long relative to the current quench duration, which may ensure an increased, and ideally maximum, coupled currents. In embodiments, the L/R time of the coil may be shorter than or comparable to the vessel resistive diffusion time, which may ensure that a large (and ideally a maximum) coil current is achieved at the end of the current quench, and that this field does not persist long after the plasma is terminated. This reduces unnecessary forces on the REMC.

Furthermore, with the passive REMC approach described herein, the mutual inductance with the plasma does not require a power supply. The current in the REMC (ideally, a very large current) only flows during a disruption, which is the only time it is desired.

In accordance with one aspect of the concepts described herein, a nuclear fusion reactor comprises an electrical conductor, the conductor being a non-axisymmetric loop comprising a plurality of portions arranged along paths defined by the surface of a torus and aligned along a toroidal direction of the torus.

In embodiments, the non-axisymmetric loop of the conductor may include a first portion arranged along the toroidal direction of the torus at a first poloidal angle; and a second portion arranged along the toroidal direction of the torus at a second poloidal angle, different from the first poloidal angle.

In embodiments, the non-axisymmetric loop of the conductor includes one or more legs arranged along a poloidal direction of the torus and coupled to the first portion and/or the second portion of the non-axisymmetric loop of the conductor.

In embodiments, the non-axisymmetric loop of the conductor includes: a plurality of upper portions, each upper portion arranged along the toroidal direction of the torus at a first poloidal angle; and a plurality of lower portions, each lower portion arranged along the toroidal direction of the torus at a second poloidal angle, different from the first poloidal angle.

In embodiments, the non-axisymmetric loop of the conductor includes a plurality of legs, each leg of the plurality of legs coupled to one of the plurality of upper portions and to one of the plurality of lower portions.

In embodiments, the non-axisymmetric loop of the conductor includes a first section comprising: a first upper portion of the plurality of upper portions; a first leg of the plurality of legs coupled to the first upper portion; a first lower portion of the plurality of lower portions coupled to the first leg; and a second leg of the plurality of legs coupled to the first lower portion.

In embodiments, the non-axisymmetric loop of the conductor includes a plurality of instances of the first section coupled to one another to produce the non-axisymmetric loop.

In embodiments, the plurality of legs are arranged along paths defined by the surface of the torus along a poloidal direction.

In embodiments, the nuclear fusion reactor may further comprise a vacuum vessel, wherein the conductor is arranged along a path defined by the inner surface of the torus, and wherein the conductor is mounted to an inboard wall of the vacuum vessel.

In embodiments, the nuclear fusion reactor may further comprise a vacuum vessel, wherein the conductor is arranged along a path defined by the outer surface of the torus, and wherein the conductor is mounted to an outboard wall of the vacuum vessel.

In embodiments, each of the plurality of upper portions and each of the plurality of lower portions have the same length.

In embodiments, the nuclear fusion reactor may further comprise a switching element coupled the non-axisymmetric loop of the conductor.

In embodiments, the nuclear fusion reactor may further comprise a vacuum vessel, wherein the conductor is mounted within the vacuum vessel, and a switching element coupled to the non-axisym metric loop of the conductor and the switching element arranged outside the vacuum vessel.

In embodiments, the nuclear fusion reactor may further comprise a switch coupled to the non-axisym metric loop of the conductor wherein the switch comprises one or more varistors arranged as a non-conducting break along the non-axisymmetric loop of the conductor.

In embodiments, the conductor is an electrically closed conductor.

In accordance with a further aspect of the concepts described herein, a runaway electron mitigation coil (REMC) comprises an upper horizontal leg; a lower horizontal leg; at least one vertical leg coupled between the upper and lower horizontal legs, wherein the upper and lower horizontal legs are configured such that the REMC functions as a passive REMC.

In embodiments, the REMC finds use in a tokamak fusion reactor.

In embodiments, the REMC is configured for outboard side mounting in a vacuum vessel of a tokamak.

In embodiments, the REMC comprises vertical legs at each half period of the upper and lower horizontal legs. In embodiment, the REMC is configured to avoid ports of a vacuum vessel in a tokamak. Thus, the upper and lower horizontal legs are disposed in the vacuum vessel of a tokamak while avoiding vacuum vessel ports.

In embodiments, the REMC further comprises a switching element disposed in one of: the upper horizontal leg, the lower horizontal leg and at least one of the at least one vertical legs.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Described herein are concepts, structures and techniques for passive mitigation of relativistic electrons produced in a tokamak plasma. These electrons may be referred to herein as "runaway" electrons (REs). As will be described herein, such passive mitigation is achieved via a runaway electron mitigation coil (REMC). The REMC may be referred to herein as "passive," meaning that no external voltage or current source need be coupled to the REMC to achieve mitigation of REs. Rather, current may flow in the REMC only during a disruption event as a result of mutual inductance between the REMC and the plasma.

Figure 1A:
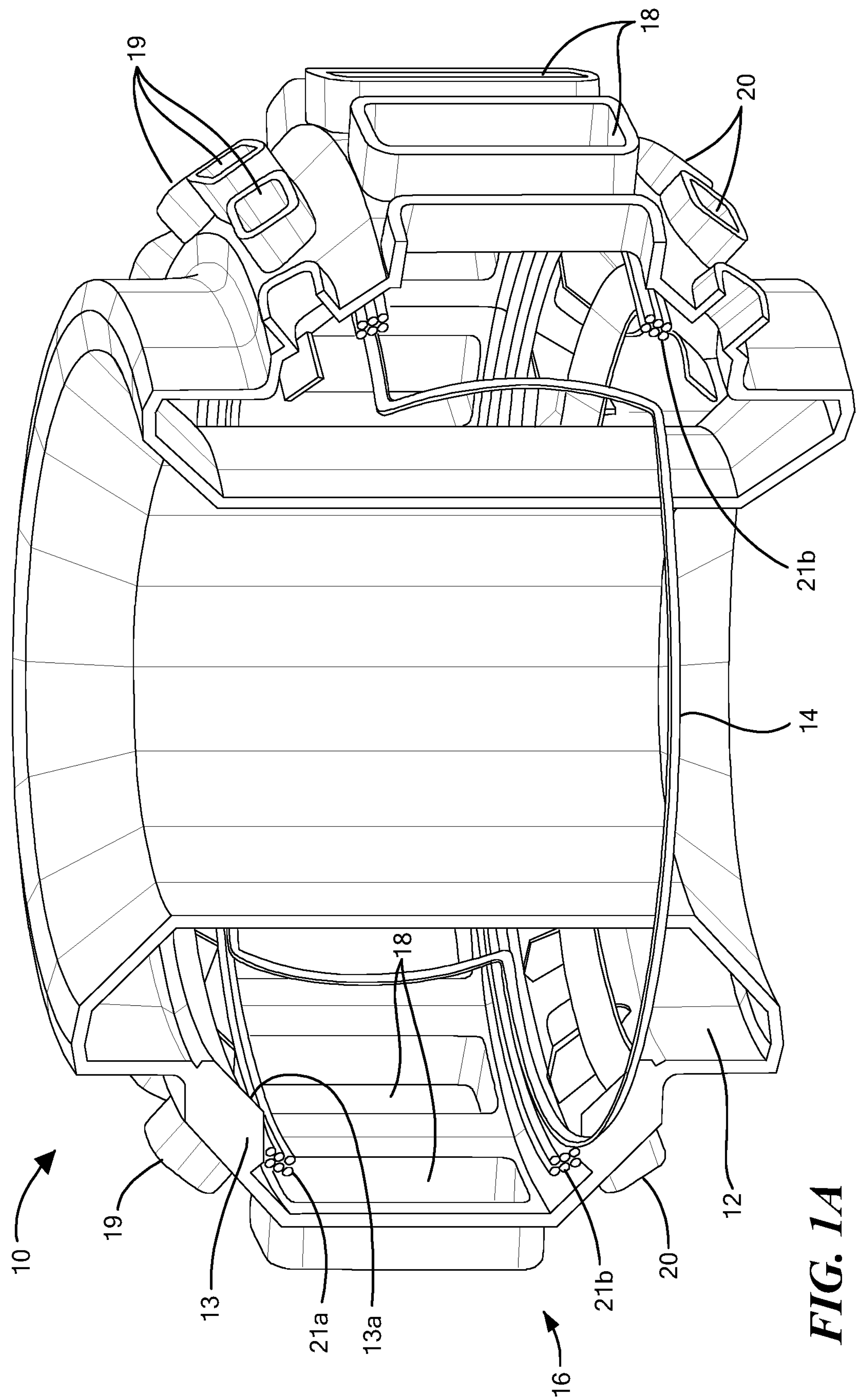
FIG. 1A is a partially sectioned isometric view of a tokamak fusion reactor having a runaway electron mitigation coil (REMC) integrated therein.
Figure 1B:
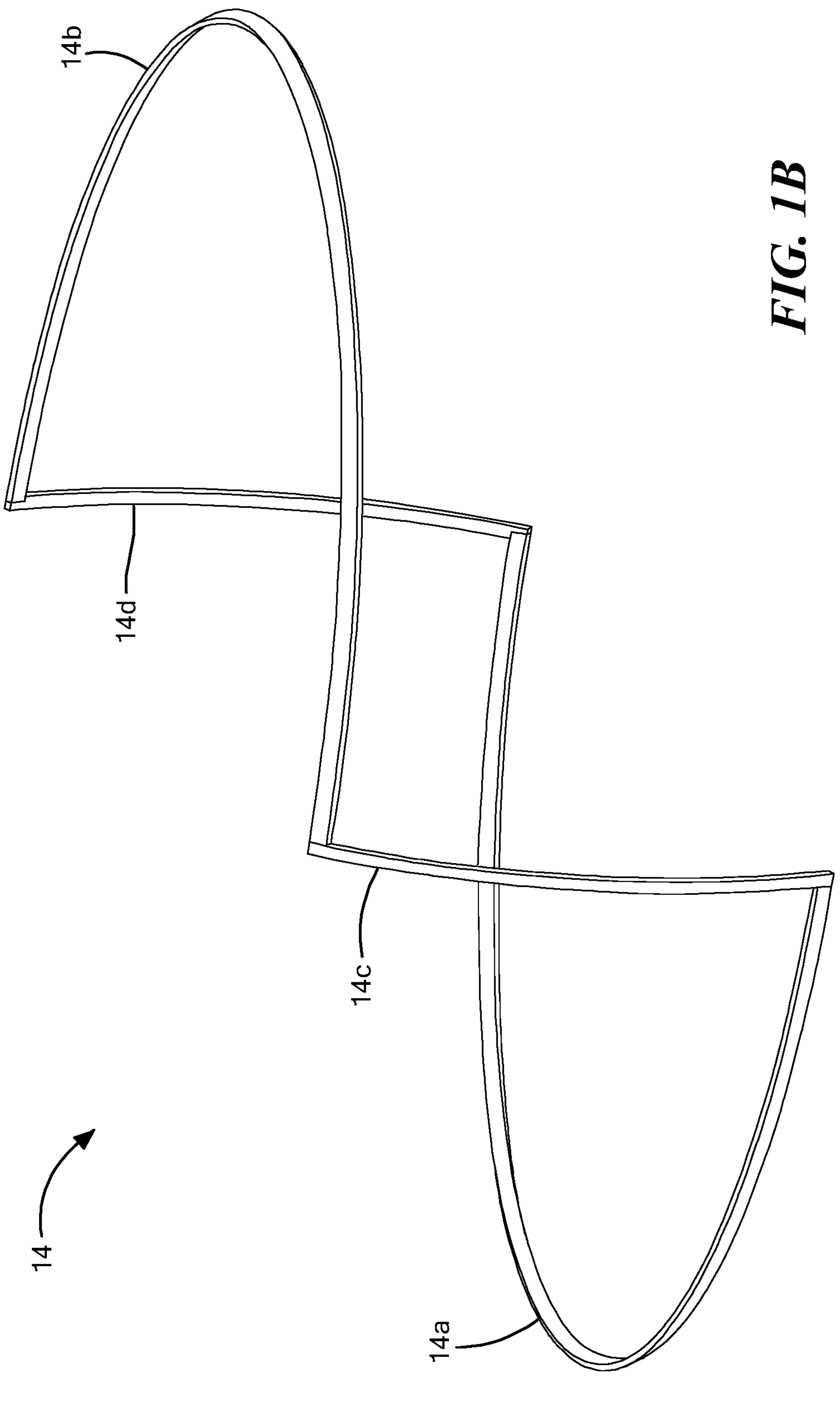
FIG. 1B is a perspective view of an outboard side REMC which may be the same as or similar to the REMC used in the tokamak fusion reactor of FIG. 1A.
Figure 1C:
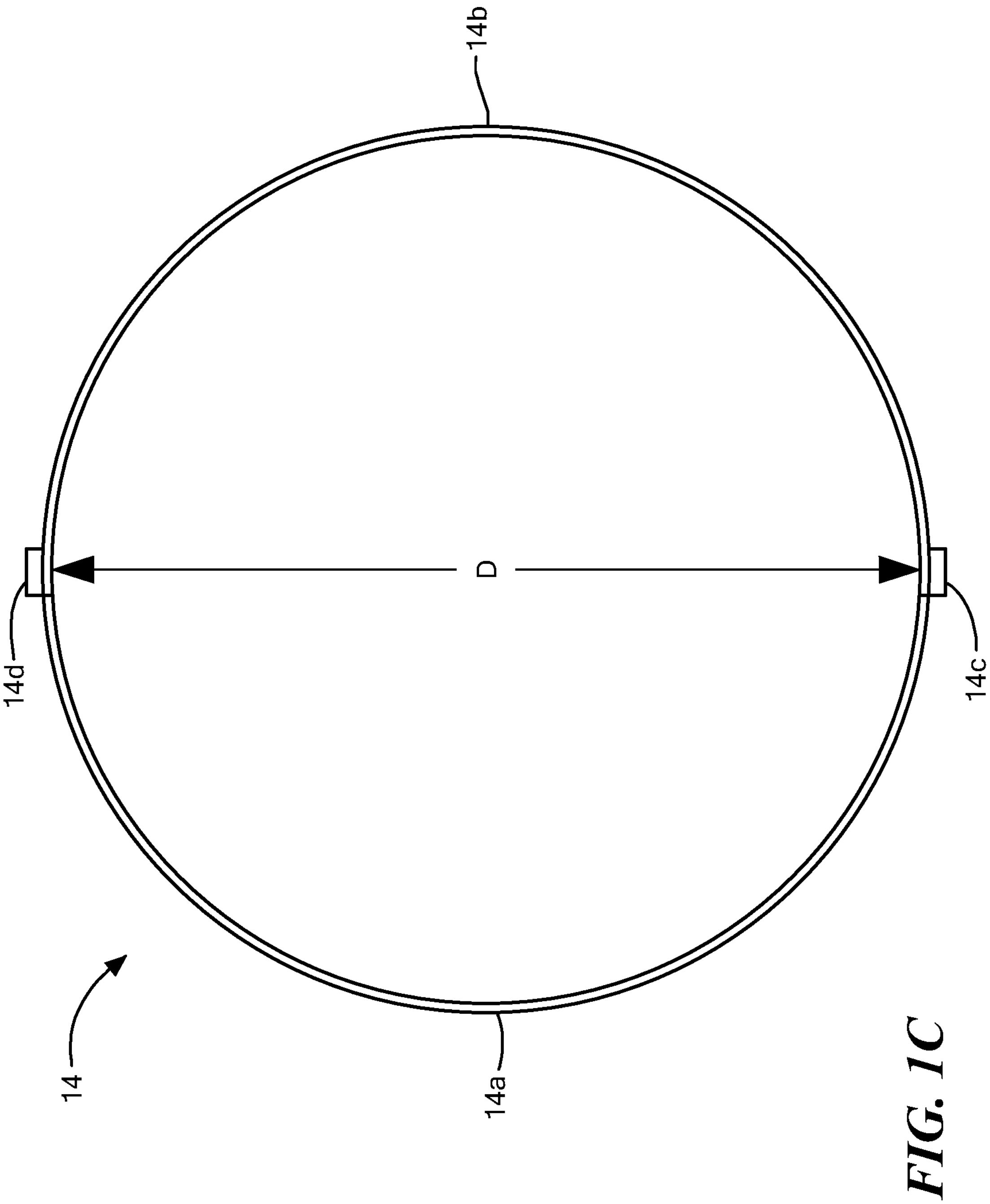
FIG. 1C is a top view of the REMC of FIG. 1B.

Referring now to FIGS. 1A-1C in which like elements are provided having like reference designations, a tokamak fusion reactor 10 comprises a vacuum vessel 12 defined by a wall 13 (sometimes referred to herein as an outboard wall 13) having an inner surface 13*a* (sometimes referred to herein as an outboard surface 13*a*). In embodiments, vacuum vessel 12 may be provided as a double wall structure having a first (or inner) wall surrounded by a second wall. A runaway electron mitigation coil (REMC) 14 is integrated or otherwise disposed in vacuum vessel 12. The outboard wall 13 may be comprised of many panels or components.

The REMC comprises an electrical conductor, the conductor being a non-axisymmetric loop comprising a plurality of portions arranged along paths defined by the surface of a torus and aligned along a toroidal direction of the torus. In embodiments, the non-axisymmetric loop of the conductor includes a first portion arranged along the toroidal direction of the torus at a first poloidal angle and a second portion arranged along the toroidal direction of the torus at a second poloidal angle, different from the first poloidal angle.

The size and shape of the REMC is selected in accordance with the size and shape of the plasma within the tokamak vacuum vessel. In general, the diameter of the REMC is selected such that the toroidal (or horizontal) legs are as close to the outboard plasma separatrix as possible and the two horizontal legs are spaced such that they do not cross, cover or otherwise impede or interfere with ports 18, 19, 20. It is desirable that the cross-section of the REMC be relatively large with respect to the cross-sectional area of the plasma. The REMC is provided having a shape which can be energized by a disruption-induced voltage, and the resulting magnetic field stochasticity causes electrons to be lost more rapidly than a RE beam can form. Thus, the REMC expels relativistic electrons from a tokamak plasma produced during disruptions before such electrons accelerate to high energy and multiply.

One or more electrically insulated mounting structures may be coupled to a wall or other structure in the vacuum vessel. For example, mounting structures may comprise mounting studs, mounting brackets or any mounting means provided on or coupled to the vacuum vessel or any structure within the vacuum vessel and the REMC may be coupled to such mounting structures. In general, the REMC may be coupled to the vacuum vessel via any permanent or semi-permanent mounting technique including, but not limited to welding.

As illustrated in FIG. 1A, the REMC is coupled to an outboard side portion of the vacuum vessel. The outboard side is that which has a larger major radius than the plasma and is complemented by the inboard side to describe all space within which the plasma resides. Any technique may be used to secure the REMC within the vacuum vessel. In embodiments, the REMC may be disposed within the vacuum vessel via brackets and alumina bushings.

As may be more clearly seen in FIG. 1B, the REMC is provided having a non-axisymmetric shape and is configured for outboard side mounting within the vacuum vessel. The REMC has a shape selected to substantially follow the shape of the plasma while at the same time being configured for outboard side mounting. In this example embodiment, the REMC 14 comprises a pair of toroidal (or horizontal) legs 14*a*, 14*b* and a pair of vertical legs 14*c*, 14*d* (or legs arranged along a poloidal direction of the torus). The vertical legs may be coupled to the toroidal legs, for instance as shown in FIG. 1B, legs 14*c*, 14*d* are coupled to and between the toroidal legs 14*a*, 14*b*. This configuration of toroidal and vertical leg portions may be referred to as an n=1 configuration, as it is formed from a single upper toroidal leg and a single lower toroidal leg. In this example embodiment, vertical legs 14*c*, 14*d* have a curved shaped between toroidal legs 14*a*, 14*b* (i.e. the vertical legs are bowed). In other embodiments, the vertical legs 14*a*, 14*b* may be straight. The shape of vertical legs 14*c*, 14*d* may not be critical to operation of the REMC 14 and may be selected to suit the needs of a particular application and accept load forces to which they will be subjected during operation.

Thus, the REMC may include: an upper portion 14*a*, arranged along the toroidal direction of the torus that defines the shape of at least part of the REMC at a first poloidal angle of the torus, and a lower portion 14*b*, arranged along the toroidal direction of the torus at a second poloidal angle of the torus, different from the first poloidal angle, and one or more legs (with two legs 14*c*, 14*d* illustrated in FIG. 1B) arranged along a poloidal direction of the torus, each of the one or more legs coupled to at least one of the plurality of upper portions and to one of the plurality of lower portions.

The REMC is provided having a height (i.e. a distance between toroidal legs) less than the height of the tokamak plasma and a diameter D (FIG. 1C) selected to such that the REMC is large enough to intercept the plasma such that the coil resistance is not dominant and the time constant (characteristic decay time) of the REMC is long compared with the disruption time, Referring again to FIG. 1A, the vertical legs are configured to allow the REMC 14 to avoid the ports (e.g., midplane ports 18 as well as upper and lower midplane ports 19, 20) in the vacuum vessel and thus REMC 14 does not interfere with plasma access. Equal extent of upper and lower toroidal legs ensures zero net coupling with vertical stability coils. Vertical legs 14*c*, 14*d*, are arranged at half periods traveling between the ports (i.e. the legs are spaced apart by 180 degrees as may be most clearly seen in FIG. 1C).

In embodiments, the REMC may have a ribbon shape. In embodiments, the REMC may have a poloidal length of about 10 cm and a radial width of about 1 cm. In general it is desirable to maximize the coil-to-plasma mutual inductance while reducing resistivity and coil self-inductance (or equivalently the coil impedance). All dimensions would scale with the plasma linear size.

The REMC is disposed on the so-called outboard side of the plasma within the vessel. The outboard side mounting approach allows the REMC to be spaced from a vacuum vessel wall by a distance which results in a desired level of currents. That is, the outboard side mounting scheme allows larger coil standoff from a vacuum vessel wall and thus higher driven currents. In the example embodiment of FIG. 1A, the REMC is disposed on or about the vertical stability coils but are disposed so as to not interfere with the vertical stability coils. It is desirable to place the REMC in a position to modify the plasma in a desired manner to prevent the buildup of REs in the plasma. In embodiments, the toroidal legs 14*a*, 14*b* are spaced from the outboard surface by a distance of about 4 cm.

In addition to coupling current into the REMC, it is important that the REMC current then produces fields that drive stochastic fields in the plasma. For maximum excitation of core tearing modes which drive the stochasticity, the coil should be optimized to produce the largest radial field (i.e. normal to the plasma surface) at the outboard mid-plane and the poloidal fall-off length of this field should be many tens of percent of the plasma minor radius.

In embodiments, the REMC may be provided as a single loop conductor to reduce terminal voltage. This allows the use of mounting structures provided from an electrically insulative material (e.g. a ceramic-based material). In embodiments, the mounting structures may be provided as rod-and-tube structures. In embodiments, the mounting structures may comprise a plasma-spray/detonation-spray coating insulation. Ratios of plasma inductance, coil inductance, wall inductance, and mutual coupling are factors in generating currents. The size shape and mounting location of the REMC is selected to increase (and ideally maximize) coil-to-plasma mutual inductance while reducing (and ideally) minimizing) the REMC self-inductance and mutual inductance with wall.

With fusion reactor 10 in operation, the REMC 14 will experience various electromechanical stresses and forces. The n=1 configuration of FIGS. 1A-1C introduces a net sideways force due to oppositely directed currents I in the two vertical legs, each of length L=1.5 m, with the force $F=2ILB\varphi<18$ MN.

In embodiments, the REMC may be secured to upper and lower vertical stability coils 21*a*, 21*b* in the vacuum vessel. More particularly, in embodiments, the vertical stability coils may be secured or otherwise coupled to the vacuum vessel via brackets (e.g. U-shaped clamps or brackets) and the REMC is coupled to the plasma side of the clamps. This approach allows the REMC to withstand the net sideways forces as well as forces resulting from vertical displacement events although it is noted that, in embodiments, forces from vertical displacement are ignorable to first order. Thus in some embodiments, the REMC may be directly coupled to the vacuum vessel wall 13*a*, while in some embodiments, the REMC may be directly coupled to the vacuum vessel wall 13*a* through another structure (e.g. vertical stability coils or vertical stability coil brackets). In still other embodiments, a combination of mounting structures and coupling of the REMC to one or more vertical stability coils may be used. In such embodiments, this may reduce the number of structural mounts 14 required for outboard side mounting.

In operation, the REMC causes runaway electron (RE) losses by opening tearing mode regions (or "islands") in the plasma that upon overlapping, generate a stochastic magnetic field that in turn results in stochastic movement of electrons out of the plasma. In addition to the vacuum fields produced by the REMC, the plasma further amplifies the fields. Runaway electrons follow (i.e. travel a path defined by) perturbed field lines out of the plasma and impact a random location of a vacuum vessel wall, thereby distributing the energy in a way that results in reduced (and ideally minimized) first wall damage.

This process is diffusive and the loss rate characteristic corresponds to the square of the perturbed field. Therefore, the REMC is configured to produce a perturbing field (and ideally, produce the largest perturbing field possible) within engineering constraints to overcome the avalanche, Compton scattering, and tritium beta decay growth terms. In embodiments, the REMC may be driven by leveraging mutual inductance with the plasma during a current quench, and the non-axisymmetric shape of the coil produces resonant fields that open magnetic islands across the plasma minor radius.

As will become apparent from the description herein below, in general the REMC may include vertical legs at each half period traveling between the ports and although in the embodiment of FIG. 1A the REMC is provided having a pair of vertical legs, in other embodiments, a REMC may comprise four or more vertical legs. Thus, there is flexibility in the number of vertical legs which a REMC may include. While flexibility in the number of vertical coil legs allows coupling to multiple plasma toroidal mode numbers and also allows high toroidal harmonic content, and non-plasma resonant loss mechanisms, inductive coupling is reduced due to the anti-symmetry of the vertical stability coils which cancels the net mutual inductance.

Also, the characteristic decay time (i.e. L/R time) may be tuned to increase (and ideally maximize) coupled currents while reducing (and ideally minimizing) the total forces. In embodiments, and as will be described below in conjunction with FIG. 2B, a resistive element (e.g. a fixed or variable resistance resistor) may optionally be electrically coupled to the REMC to adjust the L/R time and the peak current (and thus reduce forces to which the REMC is subject). Such a resistive element may either be disposed inside vessel (e.g. as would be the case in the example embodiment of FIG. 2A) or may be disposed outside the vessel (as will be described in the example embodiment of FIG. 2B). Furthermore, since changing the cross-sectional shape of the REMC changes the resistance R of the REMC, the characteristic decay time (L/R time) may also be tuned by changing a cross-sectional shape of a REMC.

In embodiments, the L/R time of the coil is long relative to the current quench duration (e.g. the L/R time of the coil may longer than the CQ duration (TCQ) by at least about 200 percent and ideally by more than 200 percent), ensuring increased, and ideally maximum, coupled currents and the L/R time is shorter than or comparable to the vessel resistive diffusion time to ensure that a large (and ideally a maximum) coil current (i.e. a coil current which is on the order 5-10 percent of the pre-disruption plasma current) is achieved at the end of the current quench, and not later. This reduces undesirable forces (e.g. electromechanical forces after the plasma is gone) on the REMC.

Furthermore, with the passive REMC approach described herein, the mutual inductance with the plasma does not require a power supply. The current in the REMC (ideally, a very large current) only flows during a disruption, which is the only time it is desired.

Figure 2A:
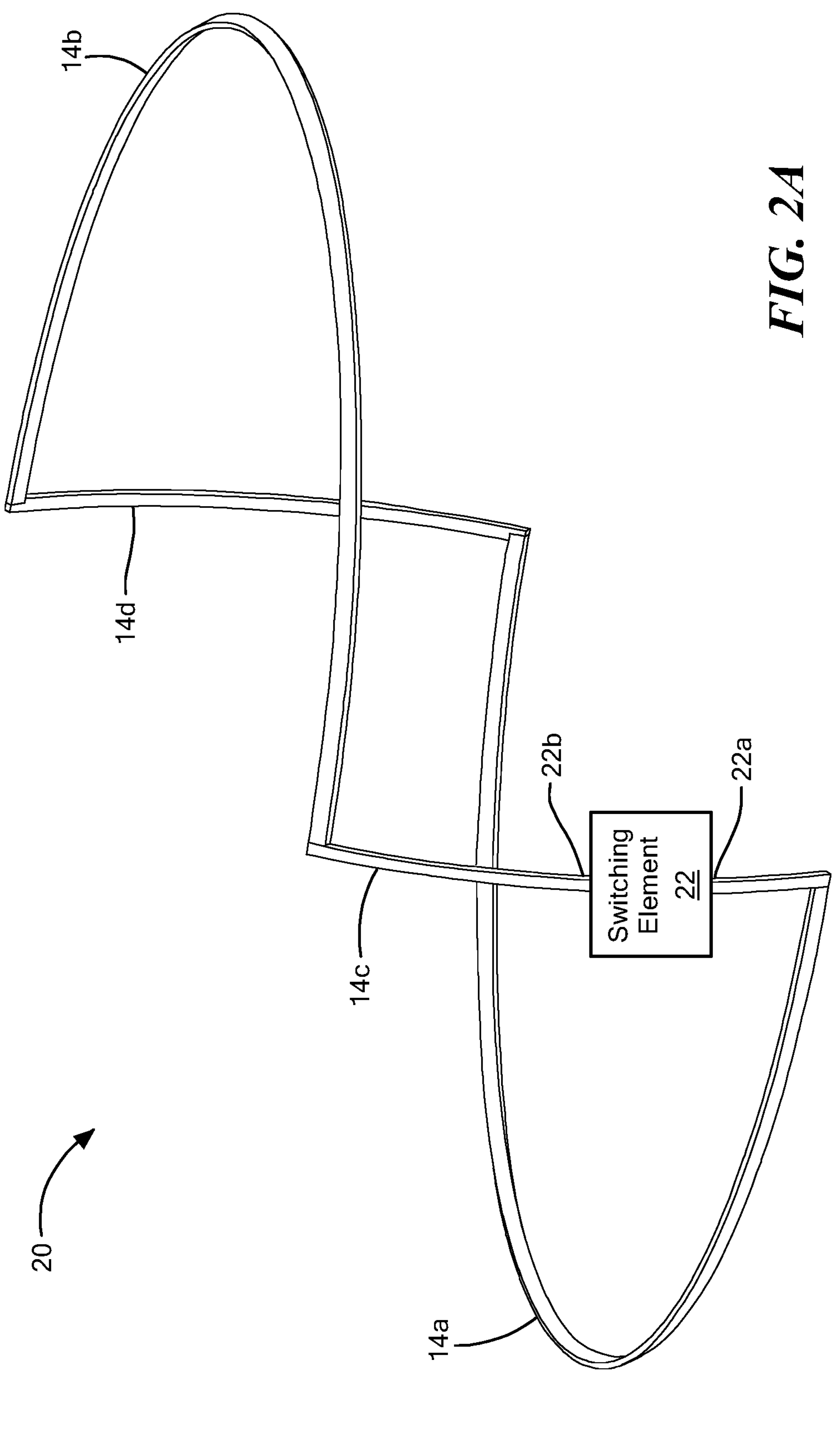
FIG. 2A is a perspective view of an alternative outboard side REMC having a switching element in a leg thereof.

Referring now to FIG. 2A a REMC 20 comprises a pair of toroidal legs 14*a*, 14*b* and a pair of vertical legs 14*b*, 14*c*. A switching element 22 is disposed in one of the vertical legs (here leg 14*c*). When the switching element 22 is closed, a low impedance signal path (and ideally a short-circuit impedance path) exists between switching element ports 22*a*, 22*b* and thus REMC 22 exhibits an electrically continuous conductive path. Conversely, when the switching element 22 is open, a high impedance signal path (and ideally an open-circuit impedance path) exists between switching element ports 22*a*, 22*b* and thus REMC 22 is electrically discontinuous.

In embodiments, switching element 22 has a fast switching speed characteristic (e.g. switching speeds on the order of microseconds or hundreds of microseconds or faster) and is passively triggered by disruption generated voltage across the coil. That is, the switch should be passive while being automatically responsive to a rapidly occurring high current event which occurs without notice. Since the rapidly occurring high current event occurs without notice and may onset within a very short time scale (e.g., milliseconds), in embodiments, the switching element may comprise a disruption predictor.

In embodiments, switching element 22 may be provided as an active fast switch triggered by some other means. In embodiments, switching element 22 may be comprise one or more Shockley diodes (e.g. high voltage Shockley diodes). In embodiments, switching element 22 may comprise a varistor. In embodiments, the switching element 22 should be capable of withstanding current I on the order of $I^{2t}$ (i.e. the switching element should not be substantially damaged by a current of such magnitude). Switching elements other than those specifically mentioned above, may, of course, also be used. For example, in embodiments, switching element may be provided as a mechanical switch, metal oxide varistor, or solid-state thyristor configured to be closed near the end of the $I_p$ ramp-up, so long as the closed-circuit REMC is non-perturbative to the plasma during normal operations, i.e. creating sufficiently small error fields. To make the system fully passive, the switch may be provided as a spark gap having a threshold voltage higher than that driving the plasma current (and ideally, much higher than that driving the plasma current Vloop <10 V, but below that expected during disruptions, about 1 kV).

Figure 2B:
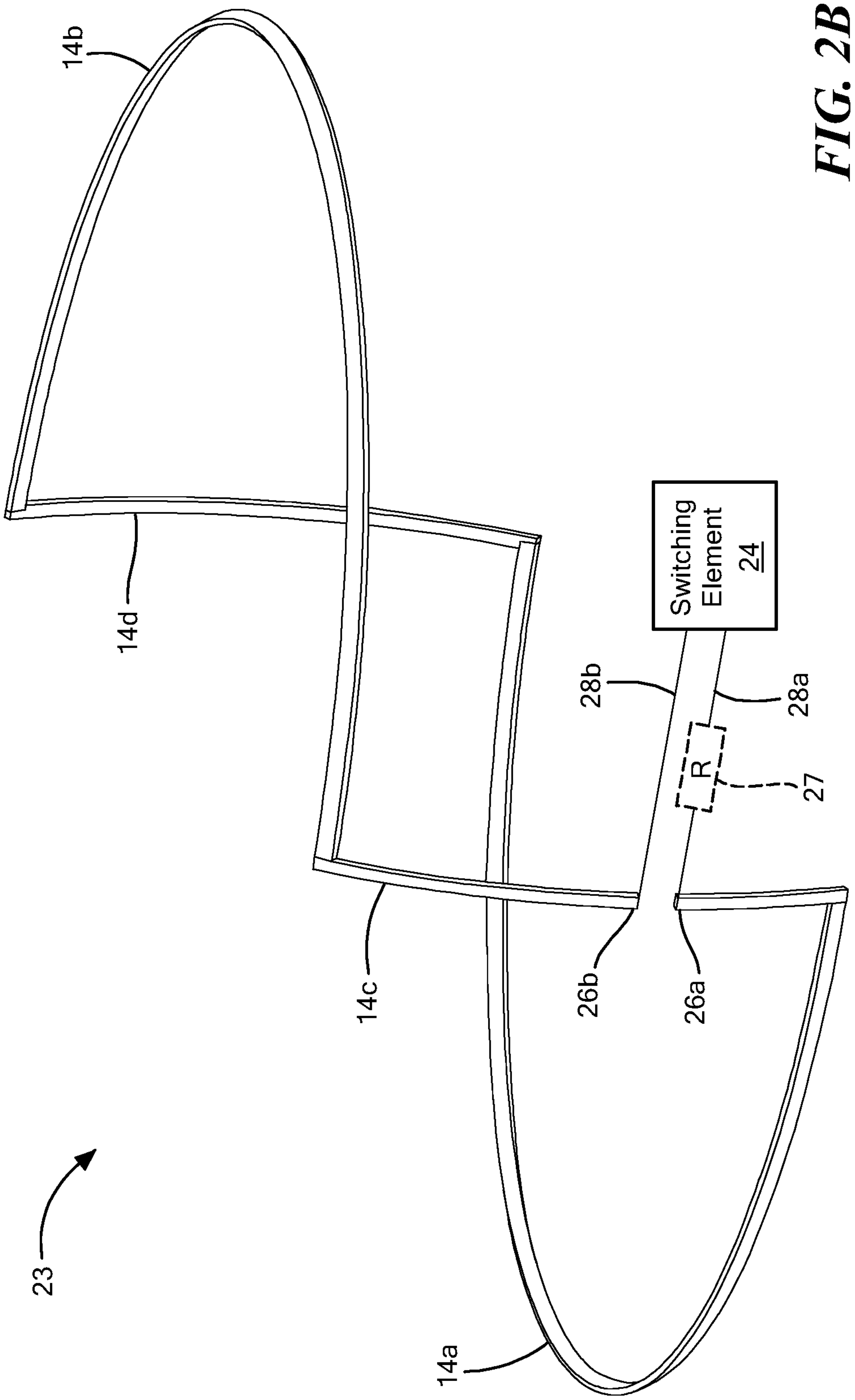
FIG. 2B is a perspective view of an outboard side REMC coupled to an external switching element.

Referring now to FIG. 2B, a REMC 23 comprises a pair of toroidal legs 114*a*, 14*b* and a pair of vertical legs 14*c*, 14*d*. A switching element 24 is coupled to open ends 26*a*, 26*b* of the REMC via signal paths (or legs) 28*a*, 28*b*. Signal paths 28*a*, 28*b* are configured to reduce inductance the paths as much as possible. For example, signal paths 28*a*, 28*b* are preferably spaced as close together as is practical. Also, signal paths 28*a*, 28*b* are preferably provided having a length which is as short as is practical (which may be achieved, for example, by physically locating switching 24 proximate REMC ends 26*a*, 26*b*). In this embodiment, switching element 24 is external to a vacuum vessel in which the REMC is disposed. Switching element 24 may be provided as any of the types described above in conjunction with FIG. 2A.

In this embodiment, switching element 24 is located outside the vessel for ease of access and radiation protection. In embodiments, an external switching element may be preferred because of simplicity and maintainability. Furthermore, the neutron environment to which an external switching element is exposed is reduced compared with the neutron environment to which an internal switching element (e.g. as illustrated in FIG. 2A) is exposed. Other tradeoffs between using an internal switch (such as switching element 22 that shown in FIG. 2A) and an external switch (such as switching element 24 that shown in FIG. 2B) is that an external switch requires the use of feedthrough structures (e.g., including signal paths 28*a*, 28*b* which may be part of a bus) which are disposed through ports in the vessel (e.g. through one or more of vacuum vessel ports 18, 19, 20 in FIG. 1). Thus, external switching elements require the use of additional mechanical structures (and associated routing of electrical paths). Furthermore, signal paths (e.g. 28*a*, 28*b*) required to couple the external switch to the REMC result in increased inductance to the switch (e.g. the inherent inductance associated with signal paths 28*a*, 28*b*).

To make the system fully passive, the switch may be provided as a spark gap having a threshold voltage higher than that driving the plasma current (and ideally, much higher than that driving the plasma current Vloop <10 V, but below that expected during disruptions, ~1 kV).

In embodiments, switching element may be provided as a mechanical switch, metal oxide varistor, or solid state thyristor configured to be closed near the end of the $I_p$ ramp-up, so long as the closed-circuit REMC is non-perturbative to the plasma during normal operations, i.e. creating sufficiently small error fields.

An analysis of an n=1 REMC in a SPARC fusion reactor suggests that in embodiments, a coil current I of only 3 kA is needed to seed a locked mode in the SPARC L-mode reference discharge, so a current smaller by an order of magnitude is targeted. Thus, a coil resistance of at least ~33 mΩ is required.

It should, however, be noted that this minimum resistance may preclude the REMC's ability to suppress "start-up" REs (generated during the low density $I_p$ ramp-up) since a coil current I>1 kA is likely needed to compete with the avalanching seed. A more complete investigation must be performed to assess the REMC's impact on lower-$l_n$ a operations as well as plasma formation.

In this example embodiment, REMC 23 comprises a resistive element 27 (e.g. a fixed, selectable or variable resistance resistor) optionally coupled to the REMC to adjust or tune the characteristic decay time (i.e. L/R time) and/or the peak current. Such tuning may reduce forces to which the REMC is subject. In the example embodiment of FIG. 2B, the resistive element 27 is outside the vessel in which the REMC is disposed. In embodiments in which the resistive element 27 comprises a resistor having a fixed resistance characteristic (i.e., a fixed resistance value), resistors having different resistance values may be used. That is, the resistance value is selectable. For example, the resistance provided by resistive element 27 may be changed by changing the resistor from a first resistor having a first resistance characteristic to a second resistor having a second, different resistance characteristic. In this way, it is possible to adjust the REMC characteristic decay time (i.e. L/R time) and/or the peak current.

As will become apparent from the description hereinbelow, the REMC may take on one of many possible periodicities (i.e., REMC configurations with n>1, where the period of the pattern of upper and lower toroidal legs of the REMC is given by (2π/n) radians). Three illustrative outboard side REMC designs are shown and described in conjunction with FIGS. 3-6, i.e. REMCs with periods of 2πR (n=1), πR (n=2), and 2πR/3 (n=3), where R is radians, are shown in FIGS. 3-6, respectively. It should, of course, be appreciated that other designs in accordance with the concepts described herein are possible.

It should be understood that any of the REMCs described herein in conjunction with FIGS. 1-6 may comprise one or more switching elements in vertical or horizontal legs thereof. Such switching elements may comprise any of the switches or switching structures described above in conjunction with FIGS. 2A, 2B. It should also be understood that any of the REMCs described herein may comprise a resistive element electrically coupled thereto to adjust the adjust the REMC characteristic decay time (i.e. L/R time) and/or the peak current.

Figure 3:
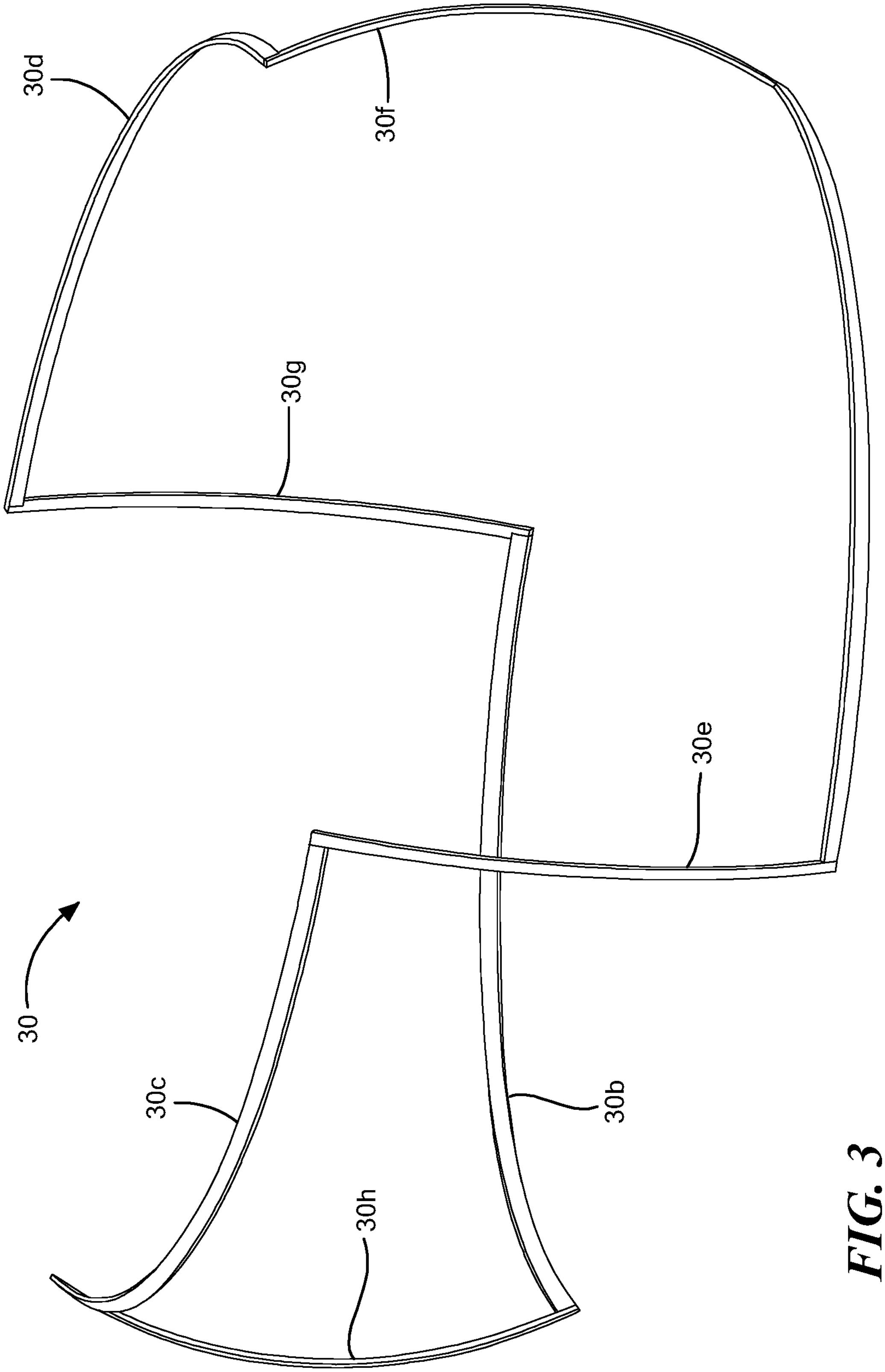
FIG. 3 is a perspective view of another alternative outboard side REMC.

Referring to FIG. 3, a REMC 30 comprises four toroidal legs 30*a*-30*d* and four vertical legs 30*e*-30*h* coupled between the toroidal legs (referred to as an n=2 configuration).

Figure 4A:
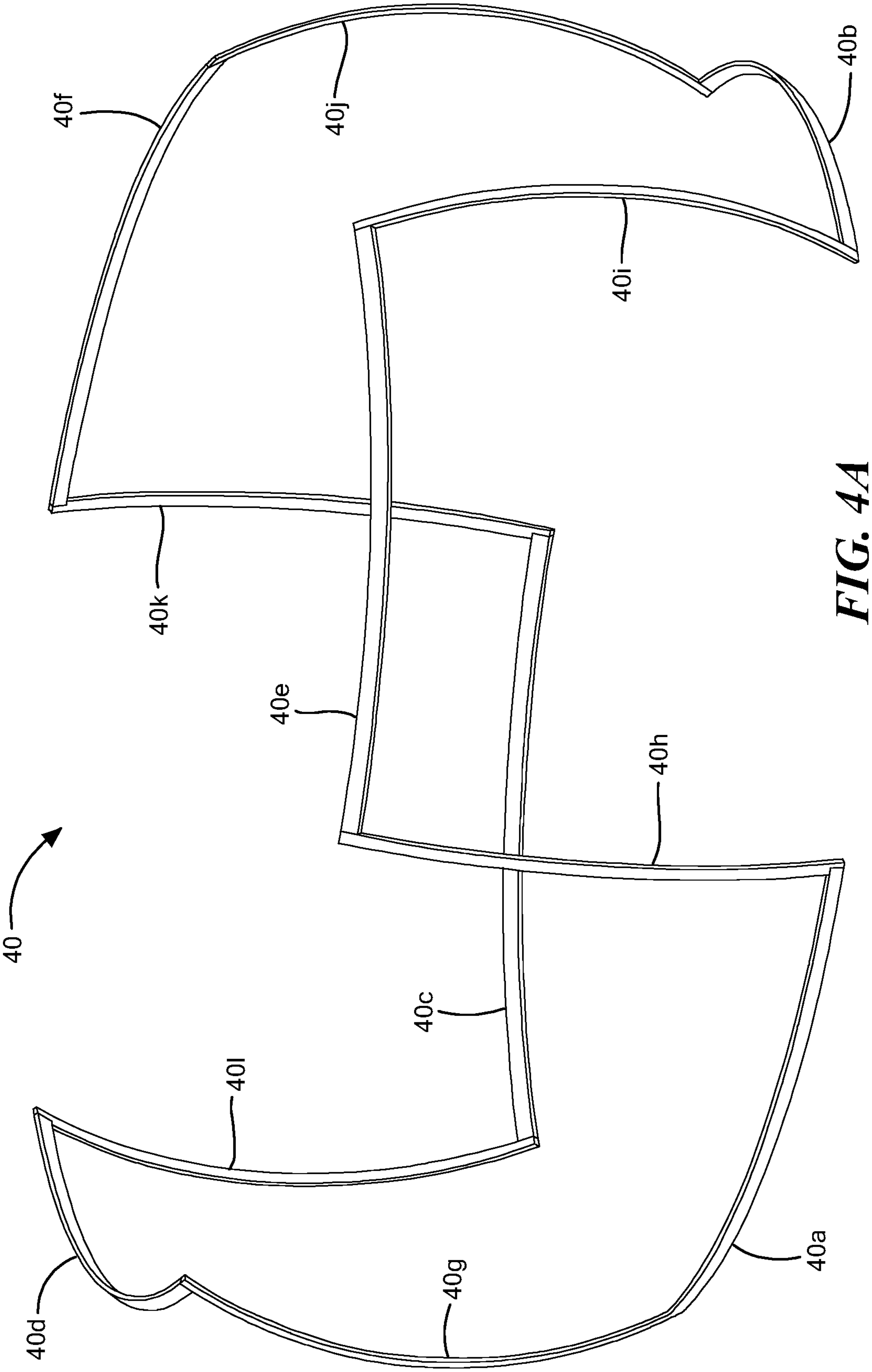
FIG. 4A is a perspective view of another alternative outboard side REMC.

Referring now to FIG. 4A, a REMC 40 comprises six toroidal legs 40*a*-40*f* and six vertical legs 40*g*-40*l* coupled between the toroidal legs (referred to as an n=3 configuration).

The vertical legs 40*g*-40*l* of the REMC 40 allow the current to traverse a vertical step at each half period, resulting in a substantial non-axisymmetry. As with the REMCs described in conjunction with FIGS. 1A-6, the vertical legs can be disposed or otherwise arranged or placed between vessel ports (e.g. ports 18, 19, 20 in FIG. 1A) allowing installation of the coil without obstructing plasma access.

Figure 4B:
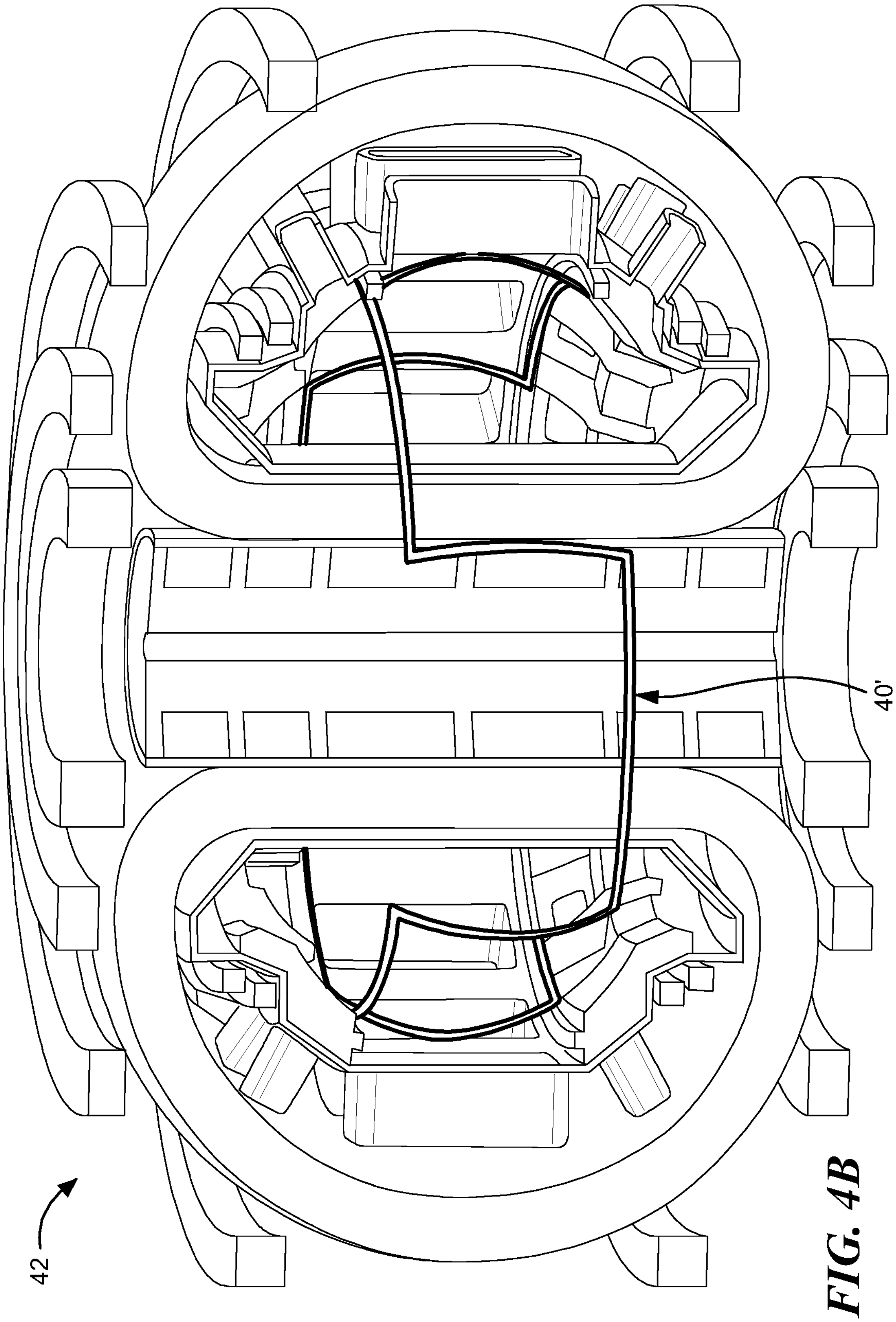
FIG. 4B is a partially sectioned isometric view of a tokamak fusion reactor having a runaway electron mitigation coil (REMC) integrated therein.

Referring now to FIG. 4B, a tokamak fusion reactor 42 comprises REMC 40' having an n=3 configuration integrated or otherwise disposed in a vacuum vessel. REMC 40' may be the same as or similar to REMC 40 of FIG. 4A.

For tokamaks with 16 toroidal field coils, this allows symmetric period of 2π radians (360 degrees), π radians (180 degrees), π/2 radians (90 degrees), and π/4 radians (45 degrees). For tokamaks for with 18 toroidal field coils, symmetries of 2π, 2π/3, and 2π/9 radians are available. However, other non-periodic choices are also available and may be effective in coupling to multiple toroidal mode numbers. Although not required for the operation of the REMC, as shown in FIG. 1, the coil is placed inboard of the vertical stability coils. This allows the REMC coil to share a structural mount with the vertical stability (VS) coils. This is allowed as the REMC has no mutual inductance when the VS coils are wired in anti-series.

Figure 5A:
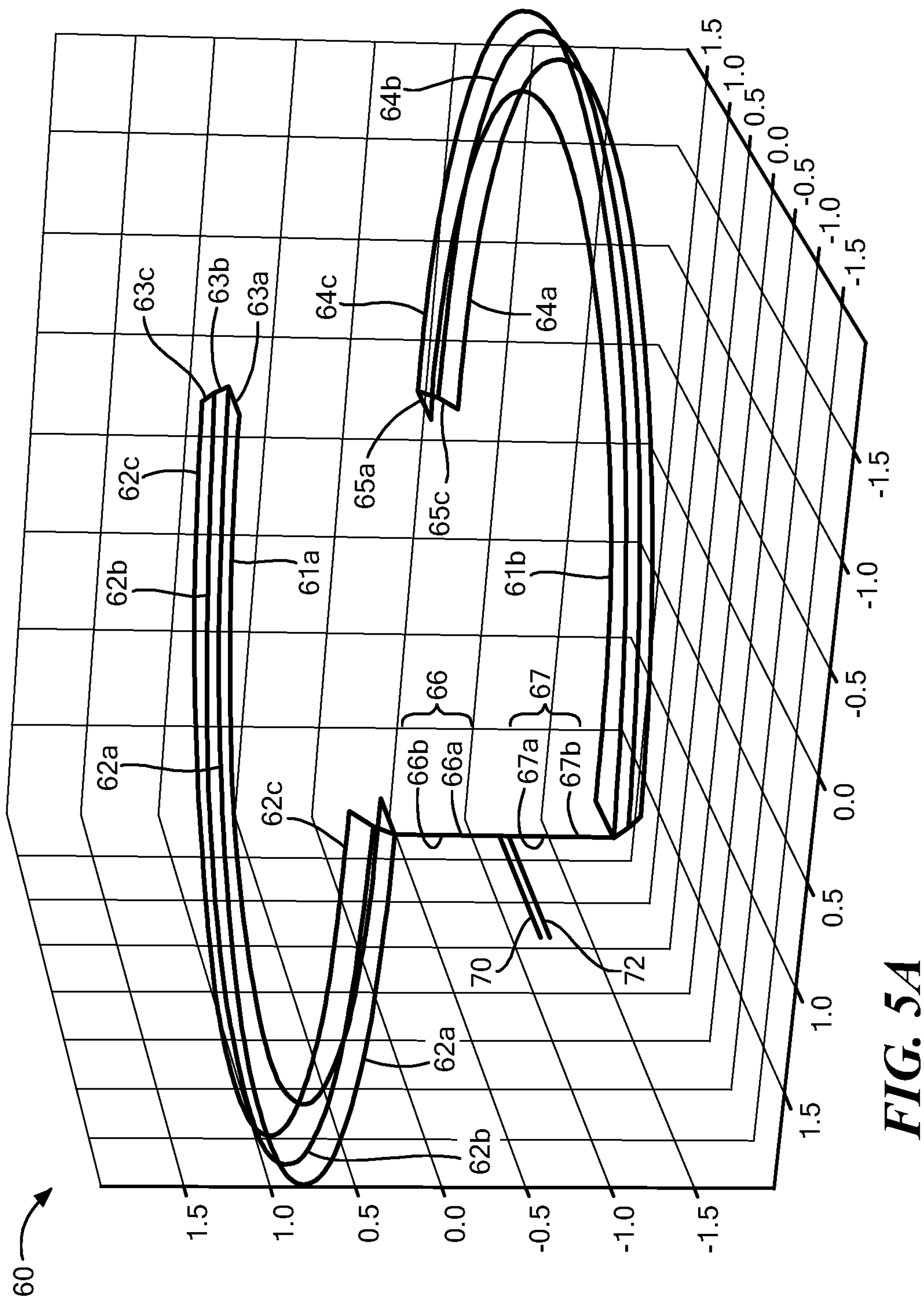
FIG. 5A is a perspective view of a net-force-free REMC.
Figure 5B:
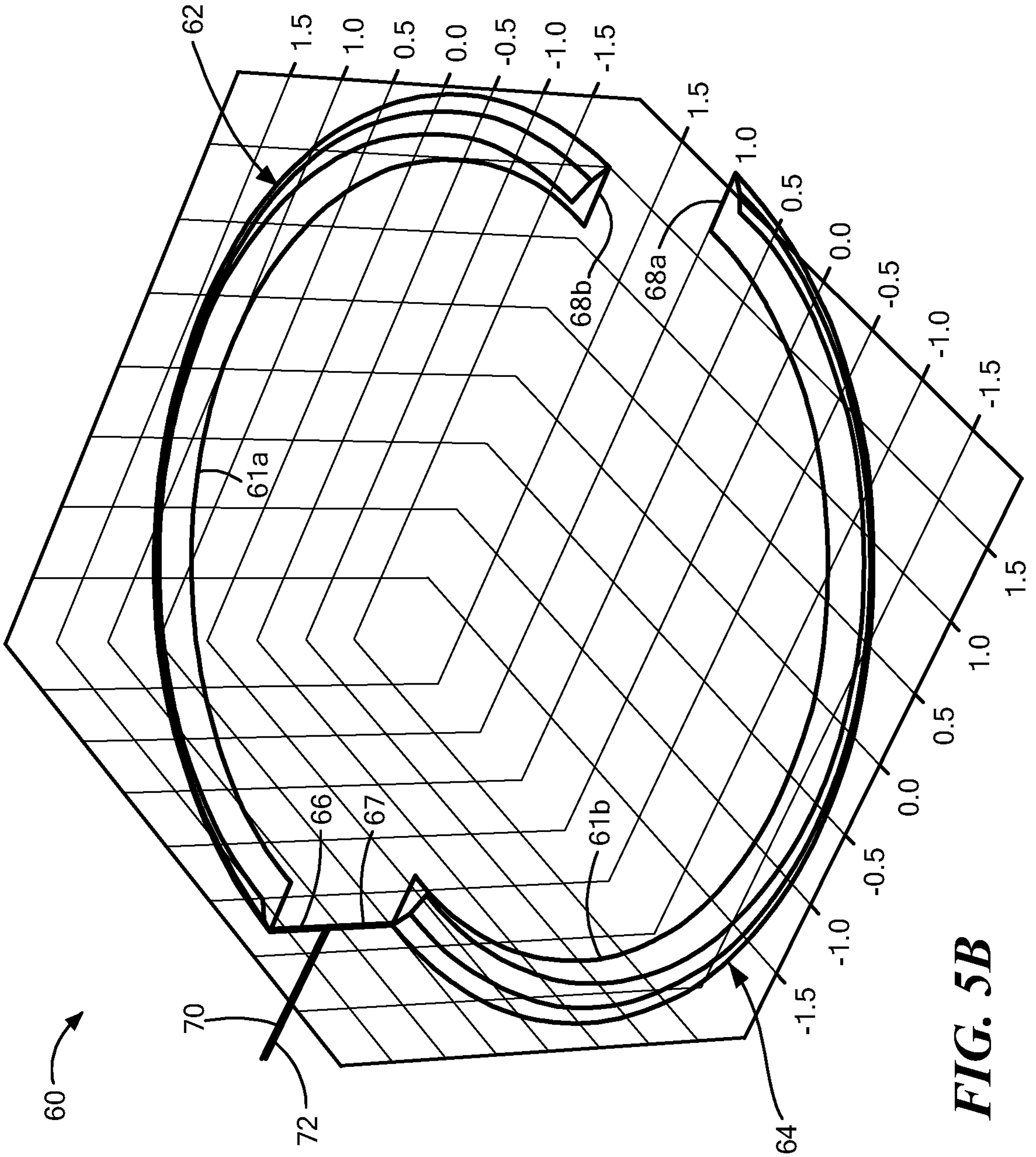
FIG. 5B is another perspective view of the net-force-free REMC of FIG. 5A.
Figure 5C:
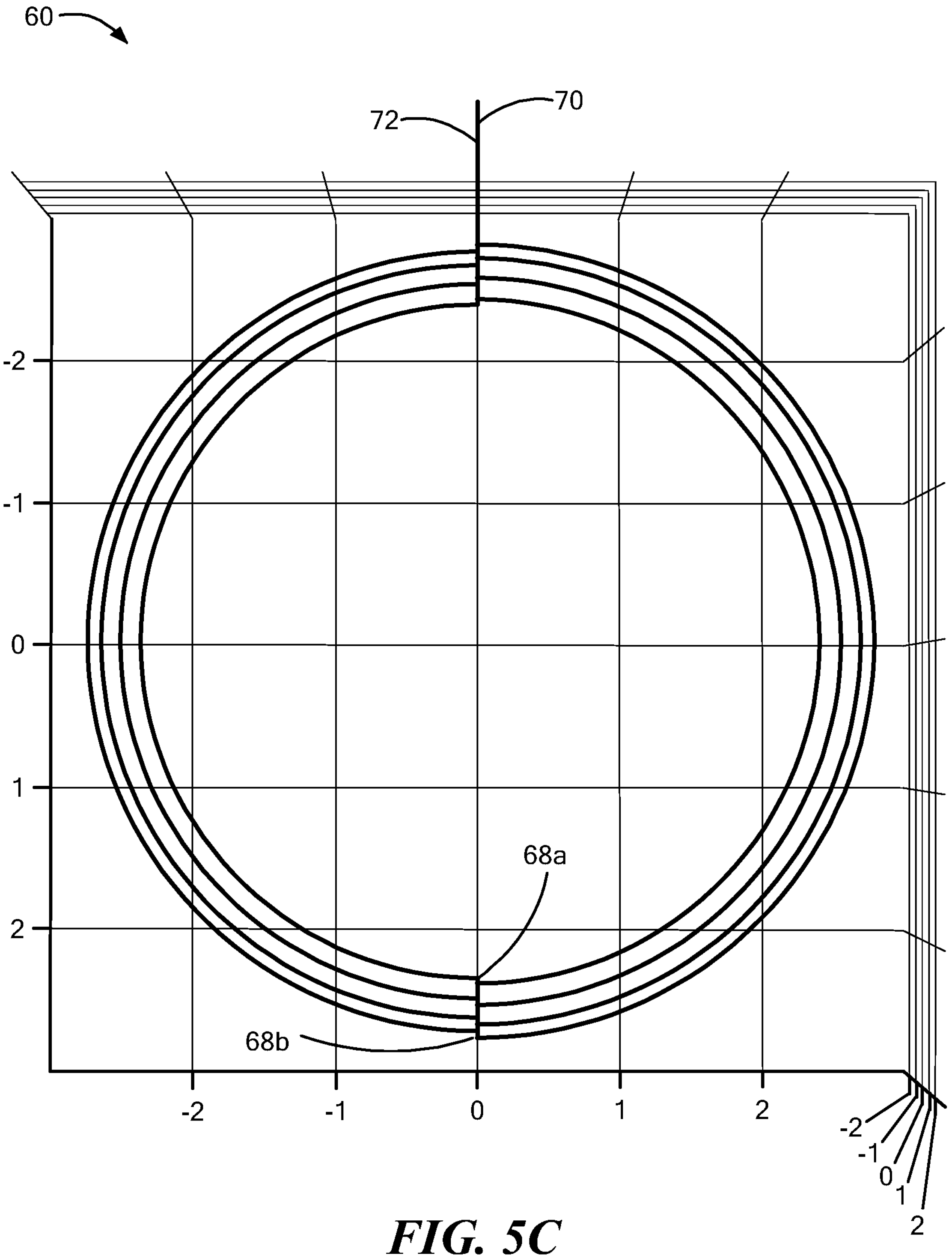
FIG. 5C is a top view of the net-force-free REMC of FIGS. 5A, 5B.

Referring now to FIGS. 5A-5C in which like elements are provided having like reference designations, a net-force-free (n=1) REMC 60 comprises a pair of horizontal legs 61*a*, 61*b* and a pair of vertical current path connectors 66, 67 with vertical current path connector 66 comprising two current paths 66*a*, 66*b* and vertical current path connector 66 comprising two current paths 67*a*, 67*b*. Significantly, current paths 66*a*, 66*b* provide both the source and sink current leads to the upper leg. Similarly, paths 67*a*, 67*b* provide both the source and sink current leads to the lower leg. With this arrangement, opposite currents flow in paths 66*a*, 66*b* and opposite currents flow in paths 67*a*, 67*b*. Those opposite currents experience opposite forces and cancel.

Horizontal leg 61*a* may be referred to as an upper main winding 61*a* and horizontal leg 61*b* may be referred to as a lower main winding 61*b*. The REMC further includes a plurality of upper return paths 62*a*, 62*b*, 62*c* and connector paths 63*a*, 63*b*, 63*c* which coupled respective ones of paths 62*a*, 62*b*, 62*c* to upper main winding 61*a*. The REMC further includes a plurality of lower return paths 64*a*, 64*b*, 62*c* and connector paths 65*a*, 65*b*, 65*c* which coupled respective ones of paths 64*a*, 64*b*, 64*c* to lower main winding 61*b*. REMC 60 further comprises a vertical current path connector 66 comprised of two conductors 66*a*, 66*b* with conductor 66*a* referred to as an upper vertical current path conductor and conductor 66*b* referred to as a lower vertical current path conductor. The single vertical current path connector is thus comprised of two conductors carrying opposite direction currents thereby nulling the force.

Upper and lower vertical current path conductors 66*a*, 66*b* lead to respective ones of signals paths 70, 72. Signal paths 70 and 72 are the source and sink currents for the whole coil and are configured to coupled to a switching element (e.g. switching element 24 in FIG. 2B) that will control when this coil is active. Thus, signal paths 70, 72 must be configured to carry high current. As noted, signal paths 70, 72 are configured to be coupled to a switching element (e.g. an external switching element) which may be the same as or similar to any of the switching elements described above in conjunction with FIGS. 2A and 2B.

Figure 5D:
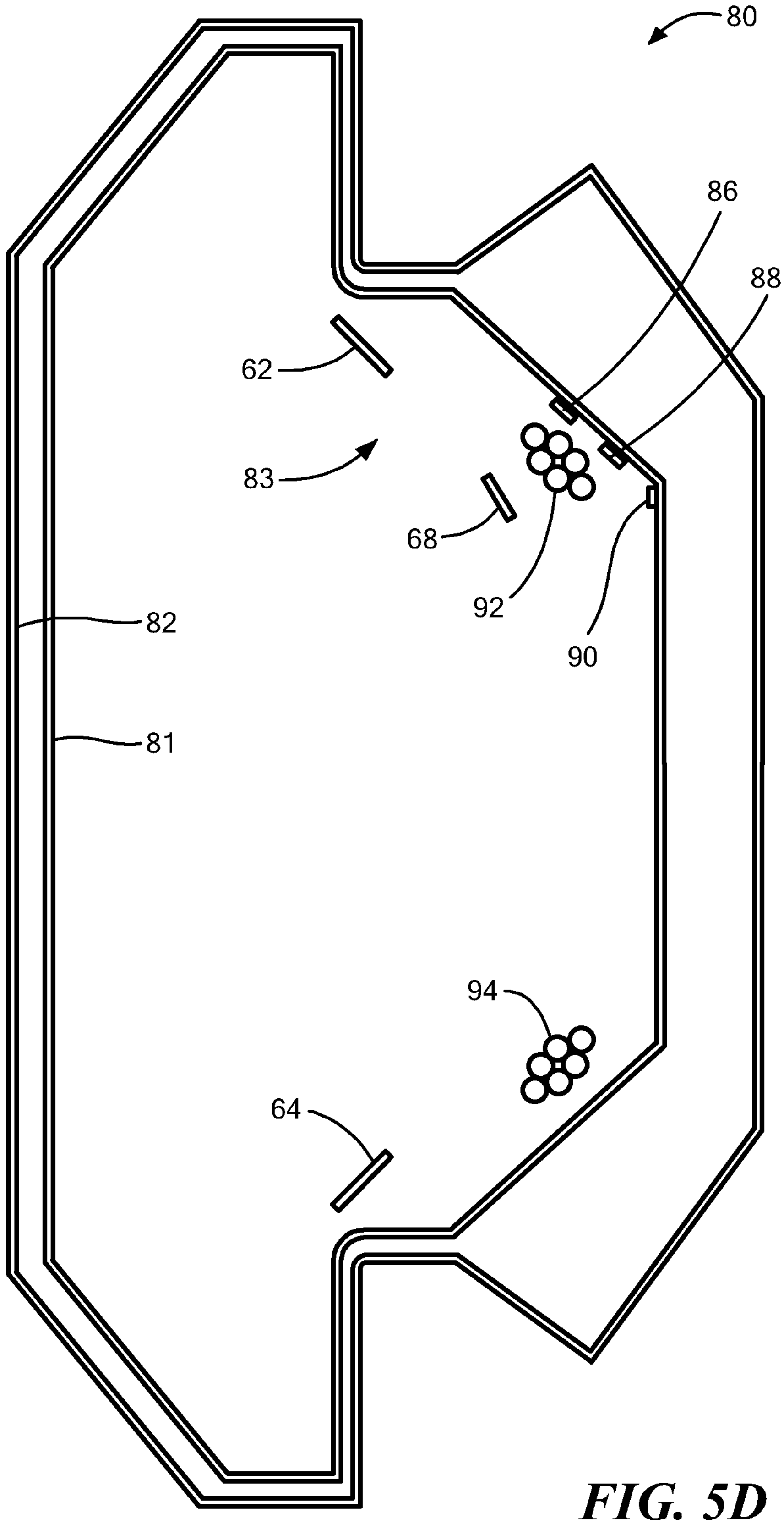
FIG. 5D is a cross-sectional view of a portion of a vacuum vessel having a net-force-free REMC disposed therein.

Referring now to FIG. 5D, a portion of a vacuum vessel 80 comprises a first or inner wall 81 and a second or outer wall 82. Thus, in this example embodiment, vacuum vessel 80 is provided as a double-wall vacuum vessel having a first (or inner) wall surrounded by a second wall.

A net-force-free REMC 83 is disposed in the vacuum vessel. The REMC may be the same as or similar to the net-force-free REMC described above in conjunction with FIGS. 5A-5C. One or more return current paths, here illustrated as three return current paths 86, 88, 90, are disposed along a surface of the vacuum vessel wall 81. Return current paths 86, 88, 90 may be the same as or similar to return currents paths 62*a*, 62*b*, 62*c* described above in FIG. 5A. Return current paths 86, 88, 90 carry a current approximately equal to the total current/N where N represents the number of return current paths (thus, in this example N=3). The return current paths are distributed to mimic the natural eddy currents in the vessel that occur without these return paths.

It should be noted that main current winding 61*a*, 61*b* may have two embodiments (or variants). In a first embodiment, the main current winding 61*a*, 61*b* may be subdivided into N insulated conductors that are in series (not shown). In a second embodiment, the main current winding 61*a*, 61*b* is provided as a single conductor and a switching element is disposed such that it may interrupt the main winding, rather than one of the return legs.

It should be appreciated that the short connectors between the main winding 61*a*, 61*b* and the return paths will still experience vertical and sideways forces. The sideways forces are the most concerning, but these could be made net-zero by adjusting the vertical position of the main winding relative to the return windings.

Also illustrated in FIG. 5D are upper and lower stability coils 92, 94.

Figure 5E:
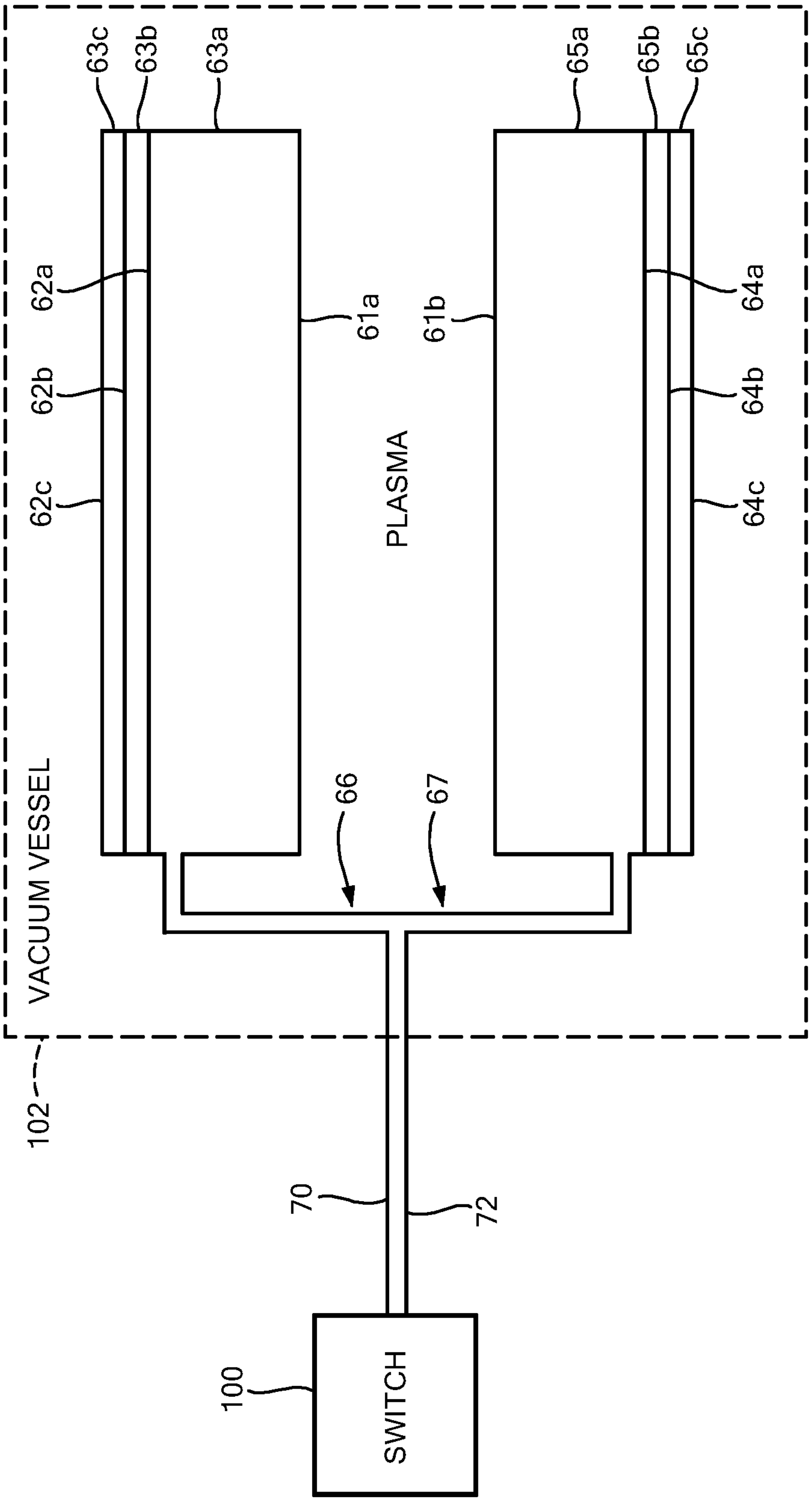
FIG. 5E is an illustrative wiring diagram
Figure 5F:
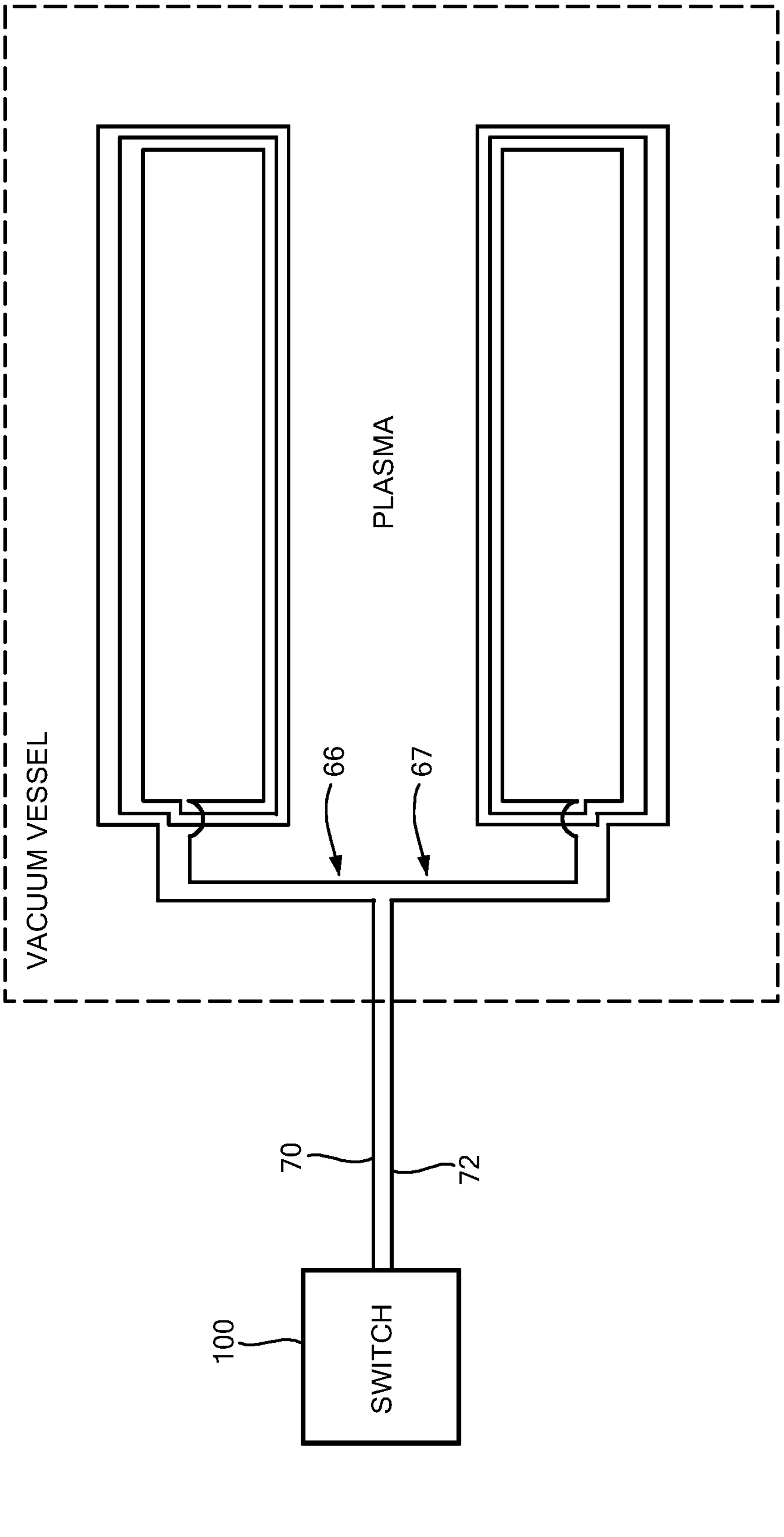
FIG. 5F is an illustrative wiring diagram of a series connection.

FIGS. 5E and 5F are illustrative wiring diagrams for a REMC with FIG. 5D comprising connections 63*a*-63*c*, 65*a*, 65*c* to electrically connect the REMC loops and FIG. 5F illustrating a series connection as shown.

Figure 6:
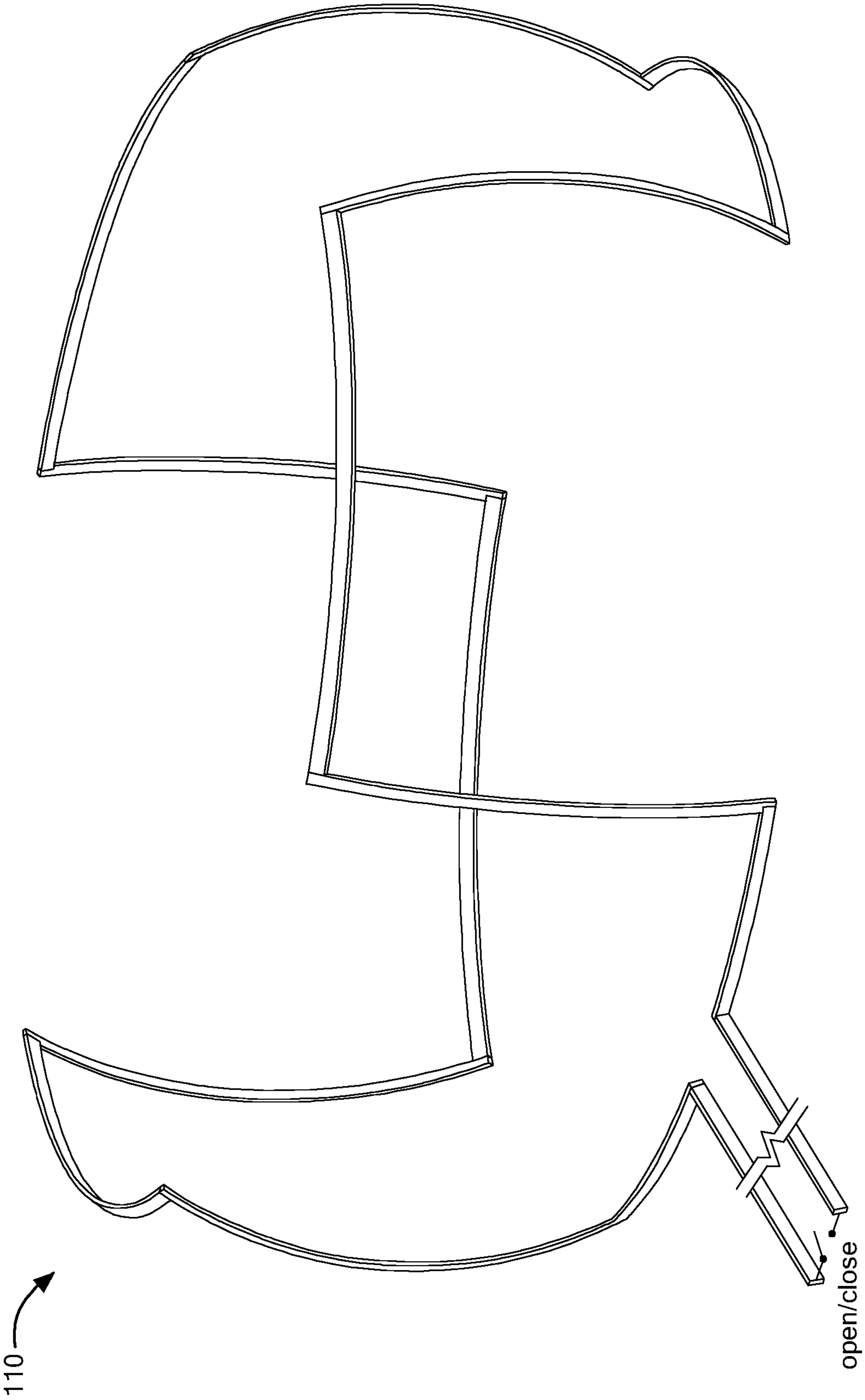
FIG. 6 is a perspective view of another alternative outboard side REMC design having a switching element disposed in a horizontal leg thereof.

Referring now to FIG. 6, a REMC 110 comprises upper and lower horizontal legs. A switching element is coupled to one of the upper and lower horizontal legs. As noted above, REMC 110 may comprise one or more switching elements (not explicitly shown in FIG. 6) coupled to a horizontal leg thereof. Such switching elements may comprise any of the switches or switching structures described above in conjunction with FIGS. 1A-5D. It should also be understood that REMC 110 may comprise a resistive element electrically coupled thereto to adjust the adjust the REMC characteristic decay time (i.e. L/R time) and/or the peak current as described above.

It should be appreciated that the generated non-axisym metric fields, potentially aided by the plasma response, open magnetic islands in the plasma, and the size of the island scales with the square-root of the perturbed resonant field. With large enough perturbed fields, and with a spectrum chosen to open islands on numerous flux surfaces, the islands will overlap and generate fully stochastic magnetic fields. The transport of runaway electrons is then to good approximation governed by the Rechester-Rosenbluth stochastic diffusion coefficient, with order 50% corrections introduced by finite orbit width effects. The induced current in the REMC will be high enough to initiate the loss of runaway electrons very early in the current quench (CQ), effectively preventing the buildup of REs throughout the remainder of the CQ. After the CQ, when the high loop voltage no longer exists, the current in the REMC remains relatively high for about an L/R time.

The REMC is a toroidal conductor, and with the coil electrically closed, its toroidal electrical resistance is still significantly higher than that of a fully developed plasma. During normal operation (i.e. not during a disruption current quench), any B-field perturbation due to the relatively small induced current in the REMC could be compensated by the error field correction coils if need be at the cost of larger high mode number error fields. Also, the small REMC B-field perturbation may possibly be an issue during plasma discharge initiation (i.e. breakdown and early current ramp up). This disclosure covers the concepts of both a fully-closed (i.e. toroidally conducting) REMC, and also a REMC that has a non-conducting break, or active mechanical, or active or passive solid-state switch, or passive varistor switch (e.g. a metal oxide varistor).

Examples of REMCs having a non-conducting break or an active mechanical or solid-state switch or passive varistor switch are illustrated in FIGS. 5-7. Embodiments other than those shown in the examples of FIGS. 5-7 are, of course, also possible. Regardless of the particular implementation, the structure or circuit (e.g. a break, switch, varistor, diode or equivalent) is configured to prevent current flowing in the REMC during startup, and optionally during the discharge flattop, but could be actively shorted or closed after the discharge is established, or before a disruption begins, or passively closed (e.g. by a high voltage generated right at the beginning of a disruption).

In some applications, the n=1 REMC configuration (e.g., see FIGS. 1A—2B) may be an optimal coil configuration for driving tearing modes. For reasons discussed above, resonant fields at each resonant surface are desired. As the toroidal harmonic of the coil is increased, the resonant field at a given surface is expected to reduce relative to the n=1 coil for equal currents by a factor of approximately $[\![ (r/b) ]\!]$ ^(m(n−1)) where r is the minor radius of the resonant surface, b is the minor radius of the REMC, and m and n are the poloidal and toroidal harmonics respectively. For example, assuming the q=m/n=2 surface is located at r/b=0.5, the n=2 coil is expected to drive a field that is 25% of the amplitude of the n=1 coil for equal current.

An REMC design on the outboard side is expected to carry more current than any inboard design due to the larger standoff from the vessel that is afforded by a larger plasma-vessel gap which may be achieved in a REMC outboard side mounting scheme. To good approximation, on short timescales like the current quench, the REMC conserves the poloidal flux trapped between it and the vessel. Increasing (and ideally maximizing) the REMC current requires increasing (and ideally maximizing) the coil plasma coupling, while reducing (and ideally minimizing) the coil self inductance and its mutual inductance with the vacuum vessel (i.e. maximizing the ratio of the plasma-coil mutual inductance to the coil self inductance while minimizing the coil-vessel mutual inductance). Although an outboard side coil has a larger major radius, and thus a higher self inductance, the increase in the enclosed flux is greater owing to the plasma-vessel geometry.

The L/R time of the coil is preferably tuned to be longer than the current quench but shorter than or comparable to the vessel resistive diffusion time. The former ensures that the maximum coil current slope and earliest application of perturbed field during the current quench (under the assumption that the vessel resistive time is always longer than the current quench duration), while the latter ensures that the REMC current does not continue to increase once the plasma is gone.

Other nearby conductors with considerable mutual inductance with the REMC will reduce the driven current. Attention will be given to reduce such mutual inductance where possible, or to increase the resistivity of competing components.

Finally, while desired operation of the REMC relies, at least in part, upon the coupling of the REMC to amplifying low order plasma modes, it is noted that high order, non-resonant fields may also cause loss of energetic particles. Thus, in embodiments, a non-resonant effect (provided by such non-resonant fields) which does not rely on plasma interactions may provide a sufficient and reliable means of energetic electron loss. In this case, a maximally periodic choice for the vertical legs may be advantageous.

While an n=1 REMC configuration is described hereinabove, it should be appreciated that n=2 and 3 designs are also possible. It should be appreciated that simulations indicate reduced and no effects of the n=2 and 3 coils, respectively, on RE formation as the induced transport does not extend as far into the plasma core, where most REs are generated. Because the engineering requirements of the n=1 coils are feasible, it may be preferred over n=2 and 3 designs.

The coil could be located on the inboard wall, however, there is considerably less space on the inboard side, and thus the wall standoff is greatly reduced. To first approximation, for fixed self-inductance, the current driven in the coil varies linearly with the wall standoff, and therefore large wall standoffs are desired.

If the coil L/R time is taken to be large rather than properly tuned, the force on the coil can triple long after the current quench without any gain in perturbed field during the current quench. The forces on the vertical legs of the coil are order meganewtons, and therefore a tripling could significantly complicate the engineering of the coil.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture or an article, that comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e. one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether or not explicitly described.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a angle with the second direction in some embodiments, within ±5% of making a angle with the second direction in some embodiments, and yet within ±2% of making a 90° angle with the second direction in some embodiments.

The invention claimed is:

1. A runaway electron mitigation coil (REMC) comprising:

an upper horizontal leg;

a lower horizontal leg;

at least one vertical leg coupled between the upper and lower horizontal legs, wherein the upper and lower horizontal legs are configured such that the REMC functions as a passive REMC; and a switching element electrically coupled to at least one of: the upper horizontal leg; the lower horizontal leg; and a vertical leg.

2. The REMC of claim 1 configured for outboard side mounting in a vacuum vessel.

3. The REMC of claim 1 wherein the upper and lower horizontal legs and the at least one vertical leg are configured to reside in a vacuum vessel while avoiding ports provided in the vacuum vessel.

4. The REMC of claim 3 further comprising vertical legs at each half period of the upper horizontal leg and the lower horizontal leg.

5. The REMC of claim 1 wherein:

the upper horizontal leg is a first one of a plurality of upper horizontal legs;

the lower horizontal leg is a first one of a plurality of lower horizontal legs; and at least one vertical leg coupled between at least one of the plurality of upper horizontal legs and at least one of the plurality of lower horizontal legs.

6. The REMC of claim 5, wherein a plurality of vertical legs are coupled between at least one of the plurality of upper horizontal legs and at least one of the plurality of lower horizontal legs.

7. The REMC of claim 5, wherein the plurality of upper horizontal legs are arranged along paths defined by a surface of a torus along a poloidal direction.

8. The REMC of claim 5, wherein each of the plurality of upper horizontal legs and each of the plurality of lower horizontal legs have the same length.

9. A runaway electron mitigation coil (REMC) comprising:

an upper horizontal leg;

a lower horizontal leg; and at least one vertical leg coupled between the upper and lower horizontal legs, wherein the upper and lower horizontal legs are configured such that the REMC functions as a passive REMC, wherein the upper horizontal leg is arranged along a toroidal direction of a torus at a first poloidal angle; and the lower horizontal leg is arranged along the toroidal direction of the torus at a second poloidal angle, different from the first poloidal angle.

10. A runaway electron mitigation coil (REMC) comprising:

an upper horizontal leg;

a lower horizontal leg; and at least one vertical leg coupled between the upper and lower horizontal legs, wherein the upper and lower horizontal legs are configured such that the REMC functions as a passive REMC, wherein the upper horizontal leg is a first one of a plurality of upper horizontal legs;

the lower horizontal leg is a first one of a plurality of lower horizontal legs; and at least one vertical leg coupled between at least one of the plurality of upper horizontal legs and at least one of the plurality of lower horizontal legs, and wherein the plurality of upper horizontal legs are each arranged along a toroidal direction of a torus at a first poloidal angle; and the plurality of lower horizontal legs are each arranged along the toroidal direction of the torus at a second poloidal angle, different from the first poloidal angle.

11. The REMC of claim 10, comprising a plurality of vertical legs, each of the plurality of vertical legs coupled to one of the plurality of upper horizontal legs and to one of the plurality of lower horizontal legs.

* * * * *